(12) United States Patent
Wang et al.

(10) Patent No.: US 10,996,065 B2
(45) Date of Patent: May 4, 2021

(54) RECORDING MEDIUM RECORDING INFORMATION OUTPUT PROGRAM, INFORMATION OUTPUT METHOD, AND INFORMATION PROCESSING APPARATUS

(71) Applicant: FUJITSU LIMITED, Kawasaki (JP)

(72) Inventors: Xin Wang, Ota (JP); Masahiro Usui, Yokohama (JP); Hiroko YuKi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 333 days.

(21) Appl. No.: 16/139,186

(22) Filed: Sep. 24, 2018

(65) Prior Publication Data

US 2019/0025066 A1 Jan. 24, 2019

Related U.S. Application Data

(63) Continuation of application No. PCT/JP2016/059991, filed on Mar. 28, 2016.

(51) Int. Cl.
*G01C 21/34* (2006.01)
*G07F 19/00* (2006.01)
(Continued)

(52) U.S. Cl.
CPC ....... *G01C 21/343* (2013.01); *G01C 21/3679* (2013.01); *G06F 16/29* (2019.01);
(Continued)

(58) Field of Classification Search
CPC ... G01C 21/343; G01C 21/3679; G07F 19/20; G07G 1/14; G06Q 20/202; G06Q 30/02;
(Continued)

(56) References Cited

U.S. PATENT DOCUMENTS

2002/0077910 A1* 6/2002 Shioda ............... G06Q 30/0267
705/14.69
2002/0165769 A1* 11/2002 Ogaki .................... G06Q 20/20
705/14.36
(Continued)

FOREIGN PATENT DOCUMENTS

JP 2002-56283 2/2002
JP 2002-329102 11/2002
(Continued)

OTHER PUBLICATIONS

International Search Report and Written Opinion of the International Searching Authority, mailed in connection with PCT/JP2016/059991 and dated Jun. 21, 2016 (10 pages).

*Primary Examiner* — Muhammad Shafi
(74) *Attorney, Agent, or Firm* — Fujitsu Patent Center

(57) ABSTRACT

A recording medium recording a program causing a computer to execute processing includes: specifying a route related with a specific terminal based on a route search condition set at the specific terminal or a route search result with the route search condition, referring to location information on a shop or a facility in a storage device, specifying a first shop or a first facility around the route related with the specific terminal and a second shop or a second facility is not around the route related with the specific terminal, and allowing, in accordance with detection of a charge payment event corresponding to the specific terminal at the first shop or the first facility, a terminal corresponding to the first shop, a terminal corresponding to the first facility, the specific terminal, or a terminal associated with the specific terminal to output information on the second shop or the second facility.

15 Claims, 27 Drawing Sheets

(51) Int. Cl.
*G07G 1/14* (2006.01)
*G06Q 20/20* (2012.01)
*G01C 21/36* (2006.01)
*G06Q 30/02* (2012.01)
*G06Q 30/06* (2012.01)
*G06Q 20/32* (2012.01)
*G06Q 20/10* (2012.01)
*G06F 16/9537* (2019.01)
*G06F 16/29* (2019.01)
*G06Q 20/08* (2012.01)

(52) U.S. Cl.
CPC ........ *G06F 16/9537* (2019.01); *G06Q 20/08* (2013.01); *G06Q 20/1085* (2013.01); *G06Q 20/202* (2013.01); *G06Q 20/3224* (2013.01); *G06Q 30/02* (2013.01); *G06Q 30/0207* (2013.01); *G06Q 30/0631* (2013.01); *G07F 19/20* (2013.01); *G07G 1/14* (2013.01)

(58) Field of Classification Search
CPC .......... G06Q 30/0631; G06Q 20/3224; G06Q 20/1085; G06Q 20/08; G06Q 30/0207; G06F 16/9537; G06F 16/29
USPC ....................................................... 701/482
See application file for complete search history.

(56) References Cited

U.S. PATENT DOCUMENTS

2012/0323692 A1* 12/2012 Shutter ................. G06Q 30/02
705/14.63
2015/0278399 A1 10/2015 Sakata

FOREIGN PATENT DOCUMENTS

| JP | 2003-50134 | 2/2003 |
| JP | 2004-5501 | 1/2004 |
| JP | 2006-16550 | 6/2006 |
| JP | 2008-89342 | 4/2008 |
| JP | 2009-163533 | 7/2009 |
| JP | 2011-232307 | 11/2011 |
| JP | 2013-33353 | 2/2013 |
| JP | 2015-195014 | 11/2015 |
| WO | 01/75710 | 10/2001 |

* cited by examiner

FIG. 8

| MEMBER ID | CURRENT LOCATION COORDINATES | DESTINATION COORDINATES | ROUTE |
|---|---|---|---|
| MEMBER A | E180/N260 | E185/N265 | ROUTE 1 |
| ⋮ | ⋮ | ⋮ | ⋮ |

FIG. 9

| MEMBER ID | SEGMENT |
|---|---|
| MEMBER A | 30s FEMALE |
| ⋮ | ⋮ |

FIG. 10

| MEMBER SHOP | COORDINATES | TARGET CUSTOMER IMAGE | COUPON ID |
|---|---|---|---|
| CONVENIENCE STORE A | E182/N261 | 10s-60s MALE, 10s-60s FEMALE | A0111、A0123、A0500 |
| SUPER PUBLIC BATH B | E185/N266 | 20s-80s MALE, 20s-80s FEMALE | B0111、B0123、B0500 |
| MOVIE THEATER C | E186/N266 | 10s-70s MALE, 10s-70s FEMALE | C0111、C0123、C0500 |
| SUPERMARKET D | E185/N264 | 20s-70s FEMALE | D0111、D0123、D0500 |
| ⋮ | ⋮ | ⋮ | ⋮ |

FIG. 11

| COORDINATES | TEMPERATURE | HUMIDITY | CATEGORY | WEATHER PATTERN |
|---|---|---|---|---|
| E180/N260 | 33°C | 80% | CLOUDY | A |
| ⋮ | ⋮ | ⋮ | ⋮ | ⋮ |

FIG. 12

| MEMBER SHOP ID | WEATHER PATTERN | PRODUCT |
|---|---|---|
| CONVENIENCE STORE A | A | BARLEY TEA, ICE COFFEE, LEMON TEA, SPORTS DRINK, STICK ICE CREAM |
| CONVENIENCE STORE A | B | HOT COFFEE, PORK BUN, ODEN |
| ⋮ | ⋮ | ⋮ |

FIG. 13

| MEMBER ID | TYPE | PRODUCT |
|---|---|---|
| MEMBER A | CONVENIENCE STORE | TEAS, WATER, SNACK |
| MEMBER A | CAFE | CAFE AU LAIT, CAFE LATTE |
| MEMBER A | SUPERMARKET | READY-MADE DISH, ALCOHOLS, ICE CREAMS |
| MEMBER A | MOVIE THEATER | MOVIE TICKET, POPCORN |
| ⋮ | ⋮ | ⋮ |

FIG. 14

| COUPON ID | COUPON-APPLICABLE PRODUCT | DISCOUNT AMOUNT | AVAILABLE PERIOD |
|---|---|---|---|
| A0111 | HOT COFFEE | ¥20 | ONE WEEK FROM ISSUE DATE |
| A0123 | BARLEY TEA | ¥30 | WITHIN ISSUE DATE |
| A0500 | STICK ICE CREAM | ¥50 | ONE MONTH FROM ISSUE DATE |
| ⋮ | ⋮ | ⋮ | ⋮ |

FIG. 15

| COUPON ID | MEMBER ID | COUPON-PROVIDER MEMBER SHOP | PROMOTED PRODUCT | COUPON-USE MEMBER SHOP | COUPON-APPLICABLE PRODUCT | DISCOUNT AMOUNT | AVAILABLE PERIOD | USE | PAYMENT No |
|---|---|---|---|---|---|---|---|---|---|
| A0123 | MEMBER A | MOVIE THEATER C | FIRST-RUN MOVIE A (SCREENED AT 8:00 P.M. ON JUNE 28TH) | CONVENIENCE STORE A | BARLEY TEA | ¥30 | 2016/6/28 | DONE | 000345 |
| ... | ... | ... | ... | ... | ... | ... | ... | ... | ... |

FIG. 16

| PAYMENT No | MEMBER ID | MEMBER SHOP ID | PRODUCT | PRICE | COUPON ID |
|---|---|---|---|---|---|
| 00345 | MEMBER A | CONVENIENCE STORE A | BARLEY TEA | 70 | A0123 |
| ⋮ | ⋮ | ⋮ | ⋮ | ⋮ | ⋮ |

FIG. 17

| PAYMENT No | MEMBER SHOP ID | PRODUCT | PRICE | COUPON ID |
|---|---|---|---|---|
| 00345 | CONVENIENCE STORE A | BARLEY TEA | 70 | A0123 |
| ⋮ | ⋮ | ⋮ | ⋮ | ⋮ |

FIG. 18

| MEMBER SHOP ID | PRODUCT | AUTOMATIC PROMOTION IMPLEMENTATION CONDITION | AUTOMATIC PROMOTION IMPLEMENTATION FLAG |
|---|---|---|---|
| MOVIE THEATER C | FIRST-RUN MOVIE A (SCREENED AT 8:00 P.M. ON JUNE 28TH) | RESERVATION RATE 12 HOURS BEFORE SCREEN START < 30% | ON |
| | FIRST-RUN MOVIE B (SCREENED AT 8:00 P.M. ON JUNE 29TH) | RESERVATION RATE 12 HOURS BEFORE SCREEN START < 30% | OFF |
| | POPCORN | BEST BY DATE < FOUR HOURS | OFF |
| ... | ... | ... | ... |
| SUPERMARKET D | BEER | BEST BY DATE < ONE DAY | OFF |
| | ICE CREAM | ELAPSED DAYS AFTER ARRIVAL > 60 DAYS | OFF |
| ... | ... | ... | ... |

FIG. 26

| MEMBER SHOP ID | COORDINATES | TARGET CUSTOMER IMAGE | COUPON ID | GROUP |
|---|---|---|---|---|
| CONVENIENCE STORE A | E182/N261 | 10s-60s MALE, 10s-60s FEMALE | A0111, A0123, A0500 | A BANK GROUP |
| SUPER PUBLIC BATH B | E185/N266 | 20s-80s MALE, 20s-80s FEMALE | B0111, B0123, B0500 | A BANK GROUP |
| MOVIE THEATER C | E186/N266 | 10s-70s MALE, 10s-70s FEMALE | C0111, C0123, C0500 | A BANK GROUP |
| SUPERMARKET D | E185/N264 | 20s-70s FEMALE | D0111, D0123, D0500 | A BANK GROUP |
| ... | ... | ... | ... | ... |
| CONVENIENCE STORE X | E172/N251 | 10s-60s MALE, 10s-60s FEMALE | X0111, X0123, X0500 | B CARD GROUP |
| MOVIE THEATER Y | E175/N256 | 20s-80s MALE, 20s-80s FEMALE | Y0111, Y0123, Y0500 | B CARD GROUP |
| CAFE Z | E176/N256 | 20s-50s MALE, 20s-50s FEMALE | Z0111, Z0123, Z0500 | B CARD GROUP |
| ... | ... | ... | ... | ... |

RECORDING MEDIUM RECORDING INFORMATION OUTPUT PROGRAM, INFORMATION OUTPUT METHOD, AND INFORMATION PROCESSING APPARATUS

CROSS-REFERENCE TO RELATED APPLICATION

This application is a continuation application of International Application PCT/JP2016/059991 filed on Mar. 28, 2016 and designated the U.S., the entire contents of which are incorporated herein by reference.

FIELD

The embodiments discussed herein are related to a recording medium recording an information output program, an information output method, and an information output system.

BACKGROUND

There is a navigation device that receives route search including setting of a destination and displays a route search result.

A related technique is disclosed in Japanese Laid-open Patent Publication No. 2008-89342.

SUMMARY

According to an aspect of the embodiment, a non-transitory computer-readable recording medium recording an information output program causing a computer to execute processing includes: specifying a route in relation with a specific terminal based on a route search condition set at the specific terminal or a route search result with the route search condition, referring to location information on a shop or a facility stored in a storage device, specifying a first shop or a first facility which is around the route in relation with the specific terminal and a second shop or a second facility which is not around the route in relation with the specific terminal, and allowing, in accordance with detection of a charge payment event corresponding to the specific terminal at the first shop or the first facility, a terminal corresponding to the first shop, a terminal corresponding to the first facility, the specific terminal, or a terminal associated with the specific terminal to output information on the second shop or the second facility.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram that illustrates an exemplary data configuration of course information;

FIG. 9 is a diagram that illustrates an exemplary data configuration of member information;

FIG. 10 is a diagram that illustrates an exemplary data configuration of member shop information;

FIG. 11 is a diagram that illustrates an exemplary data configuration of weather information;

FIG. 12 is a diagram that illustrates an exemplary data configuration of according to weather-recommended product information;

FIG. 13 is a diagram that illustrates an exemplary data configuration of purchase activity information;

FIG. 14 is a diagram that illustrates an exemplary data configuration of coupon information;

FIG. 15 is a diagram that illustrates an exemplary data configuration of coupon distribution information;

FIG. 16 is a diagram that illustrates an exemplary data configuration of payment information;

FIG. 17 is a diagram that illustrates an exemplary data configuration of sale information;

FIG. 18 is a diagram that illustrates an exemplary data configuration of promotion information;

FIG. 26 is a diagram that illustrates an exemplary data configuration of member shop information including a group category.

DESCRIPTION OF EMBODIMENTS

For example, a navigation device receives route search including setting of a destination and displays a route search result. For example, when displaying the route result, the navigation device displays not only the route but also shops, facilities, and the like on a map of an area including the route. For example, the navigation device receives setting of not only the destination but also a stop-by point and displays a route search result to the destination by way of the stop-by point.

For example, if a user sets the stop-by point with the navigation device before departure, the user is able to reach the destination by way of the set stop-by point with no troubles in accordance with the displayed route. However, in some cases, the user may not be able to set the stop-by point before departure. In such a case, the user is able to add the stop-by point by setting or searching for the route again during traveling; however, this may affect the traveling.

For example, setting of the stop-by point while taking account of traveling may be supported.

Embodiments of an information output program, an information output method, and an information output system according to the present disclosure are described below in detail with reference to the drawings. Note that these embodiments are not intended to limit this disclosure. It is possible to properly combine the embodiments without competing processing. Note that, although merely the term "shop" is used in the following embodiments, this may include not only a shop in a narrow sense for selling products but also a facility for providing services such as a movie theater and a spa.

Embodiment 1

[System Configuration]

Figure 1:
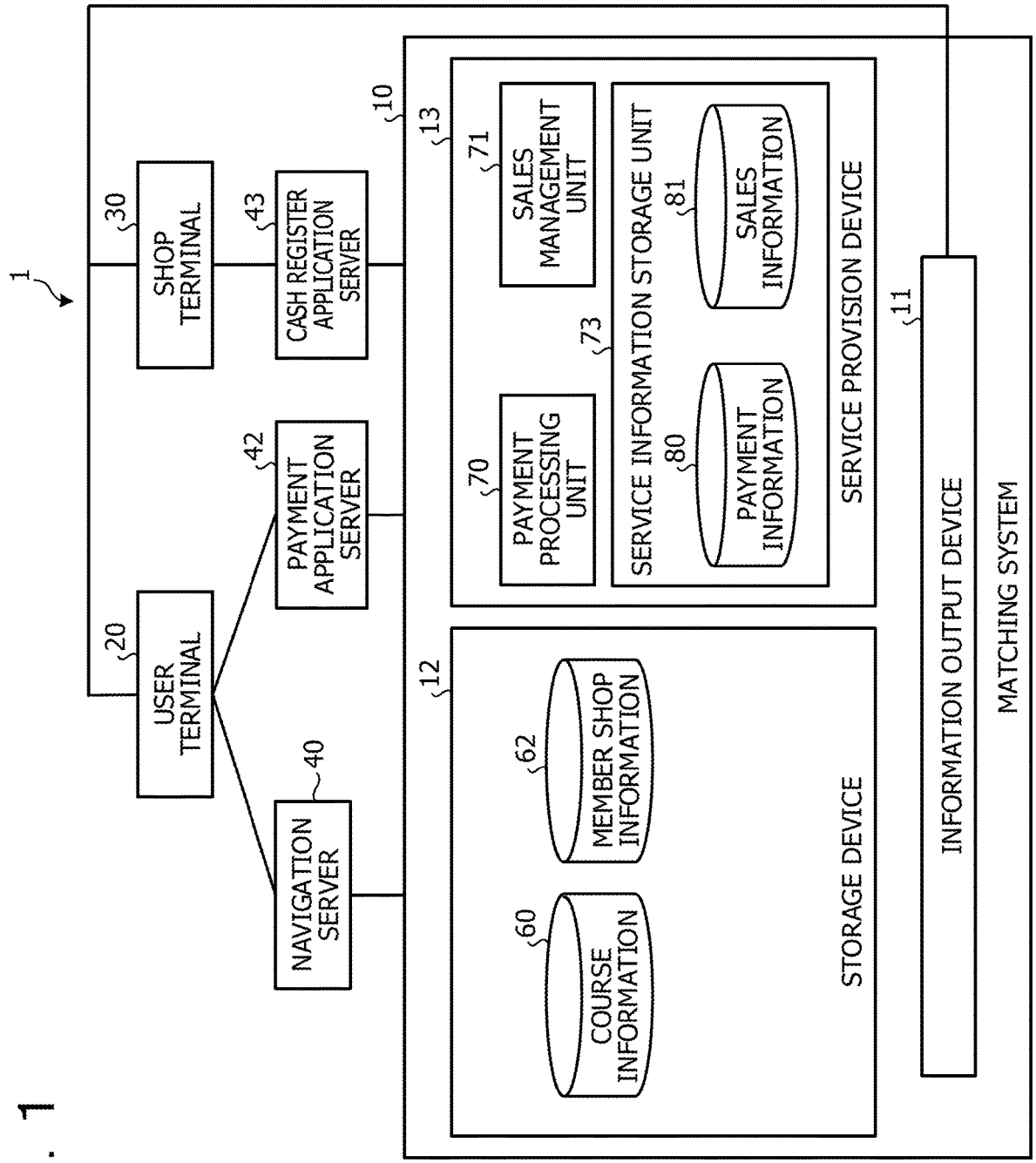
FIG. 1 is a diagram that illustrates an exemplary schematic configuration of a system according to Embodiment 1.

First, an exemplary system 1 according to Embodiment 1 is described. FIG. 1 is a diagram that illustrates an exemplary schematic configuration of a system according to Embodiment 1. The system 1 is a system that provides the user with information and services. In this embodiment, an example in which the system 1 provides the user with information on a shop and a facility is described, for example.

As illustrated in FIG. 1, the system 1 has a matching system 10, a user terminal 20, a shop terminal 30, a navigation server 40, a payment application server 42, and a cash register application server 43.

The matching system 10 is connected with the user terminal 20, the shop terminal 30, the navigation server 40, the payment application server 42, and the cash register application server 43. The user terminal 20 is connected with the navigation server 40 and the payment application server 42. The shop terminal 30 is connected with the cash register application server 43.

The navigation server 40 is a computer that has a function of providing a route search service in relation with navigation. The payment application server 42 is a computer that has a function of providing a payment service. The cash register application server 43 is a computer that has a function of providing a sales management service.

The respective systems, terminals, and servers may be communicably connected with each other via a network, for example. As an aspect of this network, it is possible to employ any type of communication network such as a local area network (LAN) and a virtual private network (VPN), which may be either wired or wireless. Note that, although the number of the provided user terminal 20 and the shop terminal 30 is one in the example of FIG. 1, it is not limited thereto. The number of the provided user terminal 20 and the shop terminal 30 may be set arbitrarily.

The matching system 10 provides the user with information and services that are generated based on the information acquired from the servers and the like. The matching system 10 may be implemented by a single computer or otherwise multiple computers. Note that, in this embodiment, an example in which the matching system 10 is implemented by multiple computers is described.

The user terminal 20 is a device owned by the user who receives the information from the matching system 10. For example, the user terminal 20 is a mobile terminal device such as a car navigation system, a smartphone, and a tablet terminal. Note that the user terminal 20 may be a smartphone or a tablet terminal functioning as a car navigation system. The user terminal 20 otherwise may be a computer such as a laptop computer and a personal computer. The user receives services from the servers via an application provided in the user terminal 20.

Via the application, the user receives the route search service from the navigation server 40, for example. When the user receives the route search service, the user terminal 20 transmits to the navigation server 40 information for identifying the user, coordinates of a current location, information for specifying a destination inputted by the user, and the like, for example. The navigation server 40 then searches for the route from the current location to the destination and transmits to the user terminal 20 information indicating the searched route, for example.

Via the application, the user receives the payment service from the payment application server 42, for example. The payment service is, for example, for the user to pay for purchasing a product or using a service at an actual shop or an online shop on the Internet. When the user receives the payment service, the user terminal 20 transmits to the payment application server 42 information for identifying the user, information on the purchased product, information on the shop the user used, and information on a payment method such as a bank account and a credit card, for example. The payment application server 42 then performs payment using the acquired information, for example.

The shop terminal 30 is a terminal used at a shop. For example, the shop terminal 30 is a point of sale (POS) terminal provided in the shop, or a smartphone, a tablet terminal, a personal computer, and the like that has a POS functionality or an accounting functionality. The user of the shop terminal 30 receives services from the servers via an application provided in the shop terminal 30.

Via the application, the user of the shop terminal 30 receives the sales management service from the cash register application server 43, for example. When the shop receives the sales management service, the shop terminal 30 transmits to the cash register application server 43 information for identifying the shop, information for identifying a sold product, information on the price and the amount of the sold product, information on the payment method, and the like, for example. The cash register application server 43 updates data on a stock of the product, sales, and the like varied by selling, for example.

[Configuration of Matching System 10]

Next, a configuration of the matching system 10 according to Embodiment 1 is described. As illustrated in FIG. 1, the matching system 10 has an information output device 11, a storage device 12, and a service provision device 13.

Figure 2:
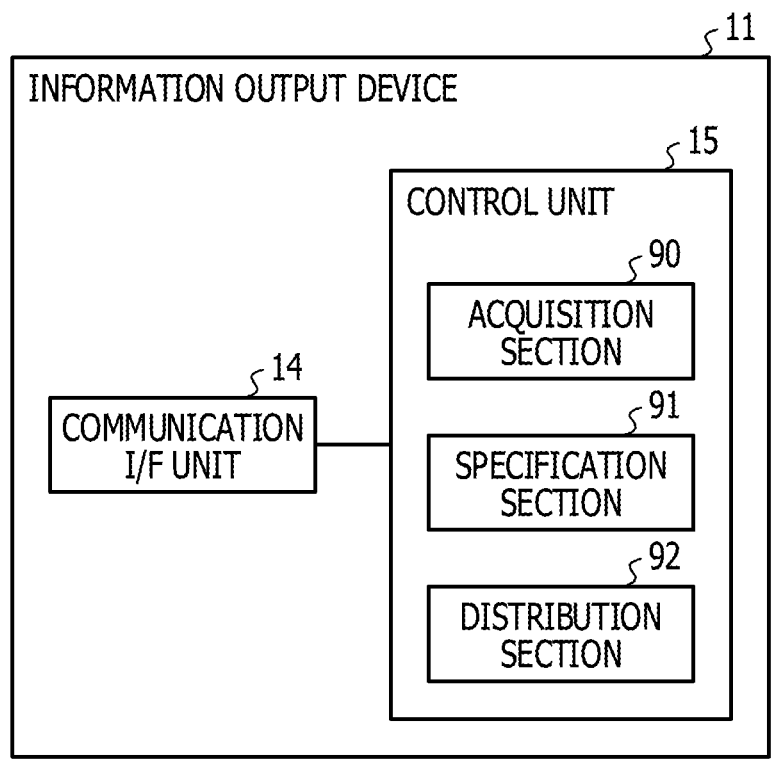
FIG. 2 is a diagram that illustrates an exemplary schematic configuration of an information output device according to Embodiment 1.

FIG. 2 is a diagram that illustrates a schematic configuration of the information output device. As illustrated in FIG. 2, the information output device 11 has a communication interface (I/F) unit 14 and a control unit 15.

The communication I/F unit 14 is an interface that controls communication between another device. The communication I/F unit 14 transmits and receives various kinds of information to and from the other device via a network. A network interface card such as a LAN card may be employed as the communication I/F unit 14. The control unit 15 has an acquisition section 90, a specification section 91, and a distribution section 92. Note that operations of the sections of the control unit 15 are described below.

The storage device 12 is a storage device such as a hard disk, a solid state drive (SSD), an optical disk, and the like.

Note that the storage device 12 may be a data-rewritable semiconductor memory such as a random access memory (RAM), a flash memory, a non-volatile static random access memory (NVSRAM). The storage device 12 may be a server device that stores and provides data.

The storage device 12 stores various programs. For example, the storage device 12 stores a program that executes later-described coupon distribution processing. In addition, the storage device 12 stores various kinds of data used for those programs. For example, the storage device 12 stores course information 60 and member shop information 62.

The course information 60 is data that stores information on a location and a route of the user. For example, the course information 60 stores information on the current location, the destination, and the route of the user. In addition, the course information 60 stores a route search condition set via the user terminal 20 or a route search result of searching with the route search condition set via the user terminal 20. The search condition is, for example, coordinates that indicates the current location, a stop-by point, the destination, and the like. The search result is data indicating a route from the current location to the destination.

The member shop information 62 is data that stores information on a member shop. For example, the member shop information 62 stores information on a location of the member shop and a customer image as a target. Note that, in the following descriptions, the member shop is synonymous with the shop or the facility.

The service provision device 13 has a payment processing unit 70, a sales management unit 71, and a service information storage unit 73. The service information storage unit 73 stores payment information 80 and sales information 81. The payment processing unit 70 stores information on payment of the user into the payment information 80. The sales management unit 71 stores information on sales at the shop into the sales information 81.

The payment information 80 is data that stores the information on payment of the user. For example, the payment information 80 stores information on the member shop where the user purchased something, a price of the purchased product, and the like.

The sales information 81 is data that stores the information on sales at the member shop. For example, the sales information 81 stores a price of the product of which the payment is made at the member shop.

[Information Output Processing]

Here, regarding the information output device 11, operations of the sections and the information output processing are described. The acquisition section 90 acquires from the course information 60 the route search condition set via the user terminal 20 or the route search result of searching with the route search condition set via the user terminal 20. The specification section 91 specifies the route in relation with the user terminal 20 based on the search condition or the search result acquired by the acquisition section 90. The user terminal 20 is an exemplary specific terminal. The specification section 91 is an exemplary course specification section and a target specification section.

In this case, when specifying a first shop or a first facility and a second shop or a second facility, the specification section 91 may specify a shop or a facility around a point on the route where the user terminal 20 has not passed yet as the first shop or the first facility.

The specification section 91 refers to location information on shops or facilities stored in the member shop information 62 of the storage device 12 and specifies the first shop or the first facility around the route in relation with the user terminal 20 and the second shop or the second facility not around the route in relation with the user terminal 20. The storage device 12 is an exemplary storage unit.

In accordance with detection of occurrence of a charge payment event corresponding to the user terminal 20 at the first shop or the first facility specified by the specification section 91, the distribution section 92 allows a terminal corresponding to the first shop or the shop terminal 30 corresponding to the first facility to output information on the second shop or the second facility. The distribution section 92 is an exemplary output section.

Figure 3:
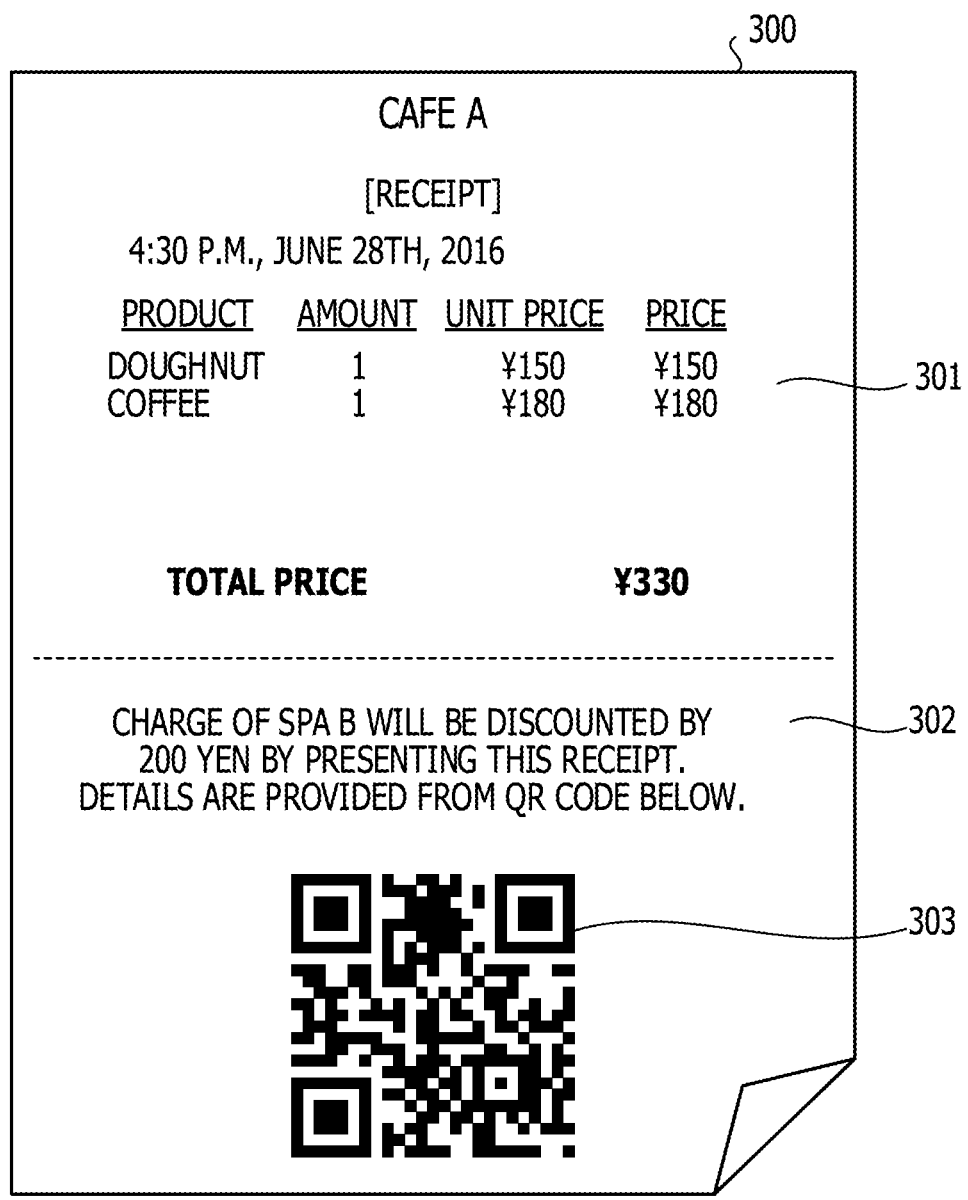
FIG. 3 is a diagram that illustrates an exemplary receipt according to Embodiment 1.

For example, the distribution section 92 allows the information on the second shop or the second facility to be outputted as a receipt. FIG. 3 is a diagram that illustrates an exemplary receipt according to Embodiment 1. As illustrated in FIG. 3, a receipt 300 issued by the shop terminal 30 has a sales information display region 301 that displays information on a product, an amount, a unit price, and a price of the sold product, which is exemplary information indicating payment details as a result of a purchase activity. The receipt 300 also has a promotion region 302 that is a region for displaying the information on the second shop or the second facility. The receipt 300 further has a link display region 303 that displays a QR code (registered trade mark) indicating a uniform resource locator (URL) of a website on which details of the second shop or the second facility are published.

In the example of FIG. 3, as the payment details, the receipt 300 indicates that one doughnut for 150 yen unit price and a cup of coffee for 180 yen unit price were purchased and the total price was 330 yen at "cafe A". As the information on the second shop or the second facility, the receipt 300 further displays discount information on "spa B" with the QR code.

In accordance with detection of occurrence of the charge payment event corresponding to the user terminal 20 at the first shop or the first facility specified by the specification section 91, the distribution section 92 may transmit to the user terminal 20 or a terminal associated with the user terminal 20 the information on the second shop or the second facility via a network. The distribution section 92 is an exemplary transmission section.

Note that the terminal associated with the user terminal 20 is, for example, a terminal set as a forwarding destination of data received by the user terminal 20. For example, if the user terminal 20 is a smartphone and is set by the user to forward data received by this smartphone to a personal computer, this personal computer is the terminal associated with the user terminal 20.

Figure 4:
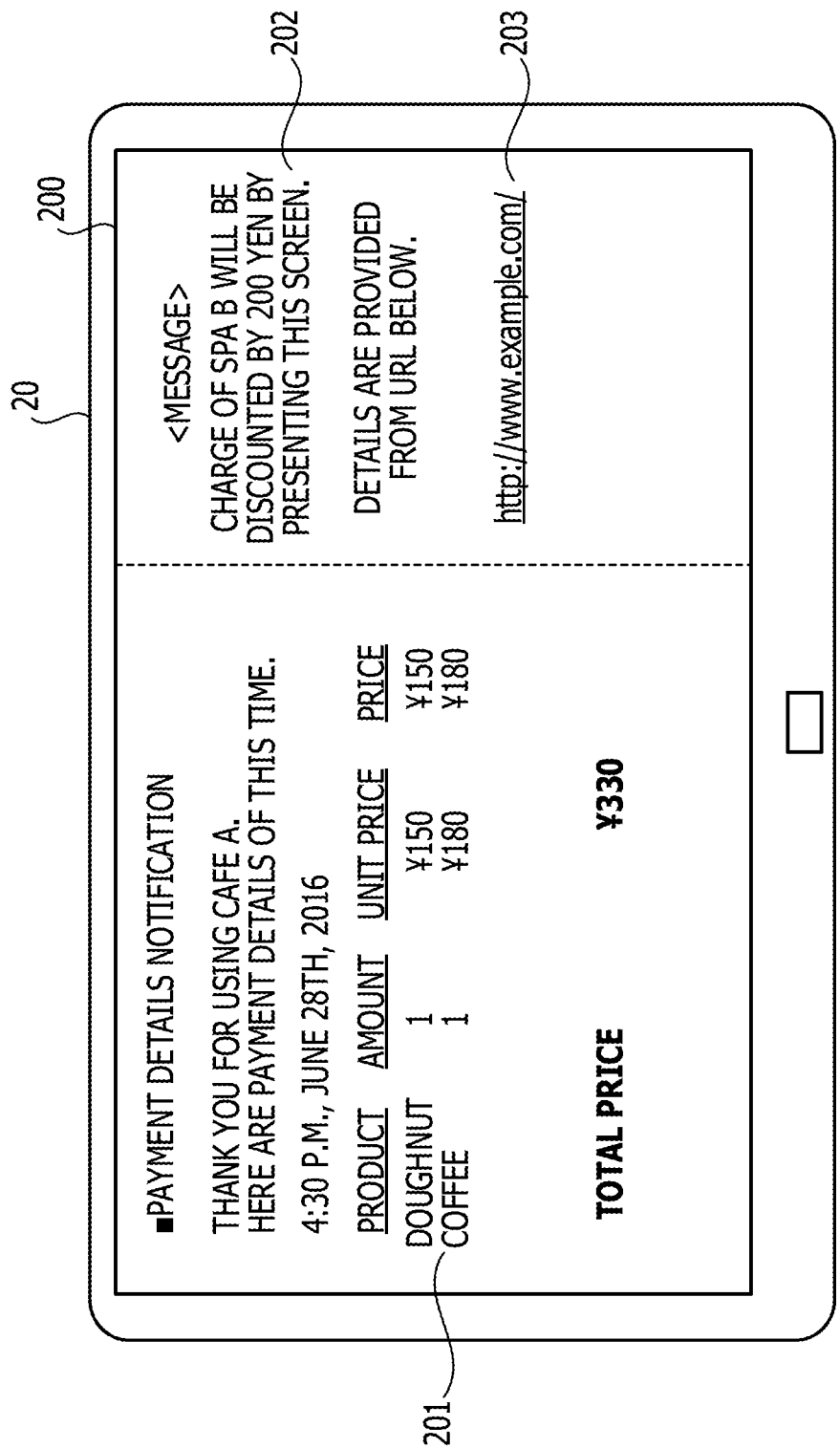
FIG. 4 is a diagram that illustrates an exemplary payment details notification screen according to Embodiment 1.

For example, the user terminal 20 displays the information on the second shop or the second facility on a payment details notification screen. FIG. 4 is a diagram that illustrates an exemplary payment details notification screen according to Embodiment 1. As illustrated in FIG. 4, a payment details notification screen 200 displayed on the user terminal 20 has a payment information display region 201 that displays information on a product, an amount, a unit price, and a price of the paid product, which is exemplary information indicating payment details at the first shop. The payment details notification screen 200 also has a promotion region 202 that is a region for displaying the information on the second shop or the second facility and a link display region 203 that displays the URL of the website on which details of the second shop or the second facility are published.

In the example of FIG. 4, as the payment details, the payment details notification screen 200 indicates that one doughnut for 150 yen unit price and a cup of coffee for 180 yen unit price were purchased and the total price was 330 yen at "cafe A". As the information on the second shop or the second facility, the payment details notification screen 200 further displays discount information on "spa B" with the URL.

[Processing Flow]

Figure 5:
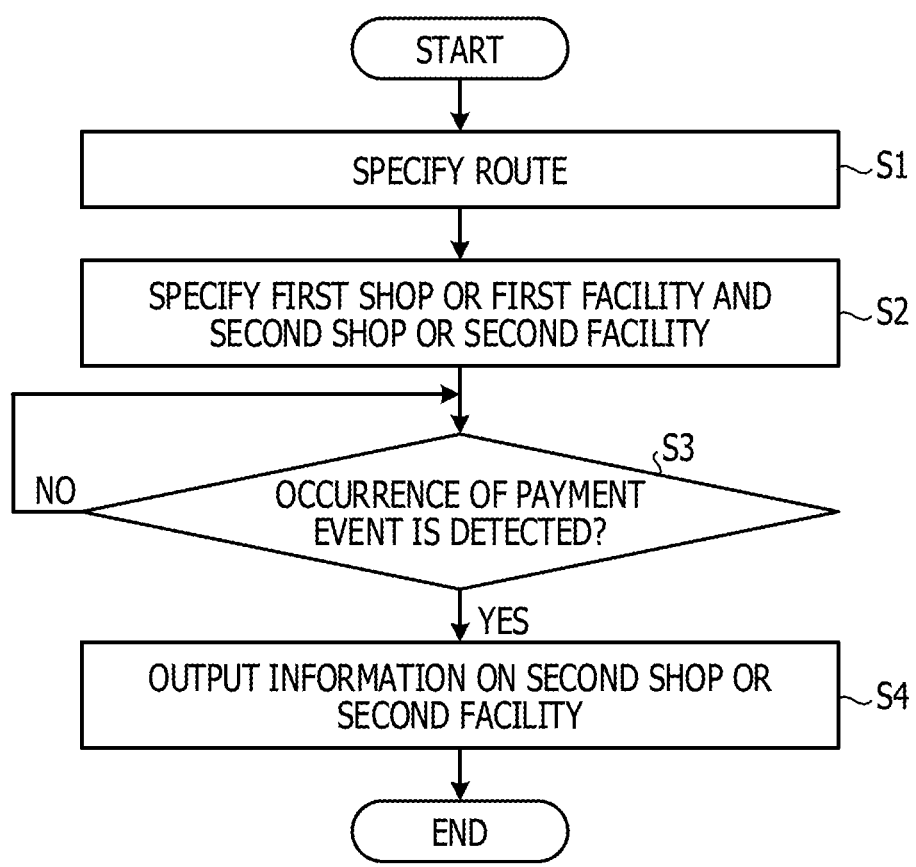
FIG. 5 is a flowchart that illustrates an exemplary procedure of information output processing according to Embodiment 1.

Next, a flow of the information output processing according to this embodiment is described. FIG. 5 is a flowchart that illustrates an exemplary procedure of the information output processing according to Embodiment 1. First, the specification section 91 specifies a route in relation with the user terminal 20 based on the route search condition or the route search result acquired from the course information 60 by the acquisition section 90 (S1). Next, the specification section 91 refers to the location information on shops or facilities stored in the member shop information 62 of the storage device 12 and specifies the first shop or the first facility around the route in relation with the user terminal 20 and the second shop or the second facility not around the route in relation with the user terminal 20 (S2).

At this point, when the occurrence of the charge payment event corresponding to the user terminal 20 at the first shop or the first facility is detected (S3 Yes), the distribution section 92 outputs the information on the second shop or the second facility (S4). Note that the output may be performed by allowing the terminal corresponding to the first shop or the shop terminal 30 corresponding to the first facility to issue a receipt. Otherwise, the output may be performed by transmitting to the user terminal 20 or the terminal associated with the user terminal 20 the information on the second shop or the second facility via a network. Note that, when no occurrence of the charge payment event is detected (S3 No), the information output device 11 waits without executing the information output processing.

[Effect]

The information output device 11 according to this embodiment acquires the route search condition set via the user terminal 20 or the route search result of searching with the route search condition set via the user terminal 20. This information output device 11 specifies the route in relation with the user terminal 20 based on the acquired search condition or the search result. The information output device 11 refers to the location information on shops or facilities stored in the storage unit and specifies the first shop or the first facility around the route in relation with the user terminal 20 and the second shop or the second facility not around the route in relation with the user terminal 20.

In accordance with detection of occurrence of the charge payment event corresponding to the user terminal 20 at the specified first shop or the first facility, the information output device 11 allows the terminal corresponding to the first shop or the shop terminal 30 corresponding to the first facility to output the information on the second shop or the second facility. Occurrence of the charge payment event at the first shop or the first facility corresponding to the user terminal 20 represents that the user using the user terminal 20 is in the shop or the facility and not driving. At this timing, the information output device 11 allows the information on the second shop or the second facility that would be a candidate of the stop-by point to be outputted. In this way, the information output device 11 is able to support setting of the stop-by point while taking account of traveling.

In accordance with detection of occurrence of the charge payment event corresponding to the user terminal 20 at the specified first shop or the first facility, the information output device 11 transmits to the user terminal 20 or the terminal associated with the user terminal 20 the information on the second shop or the second facility. In this way, the information output device 11 is able to support setting of the stop-by point while taking account of traveling.

Since the first shop or the first facility and the second shop or the second facility are specified before the occurrence of the charge payment event, no processing for specifying the first shop or the first facility and the second shop or the second facility is performed when the occurrence of the charge payment event is detected; thus, it is possible to quickly perform information output and the like after the occurrence of the charge payment event is detected.

When specifying the first shop or the first facility and the second shop or the second facility, the information output device 11 may specify a shop or a facility around the point on the route where the user terminal 20 has not passed yet as the first shop or the first facility.

Figure 6:
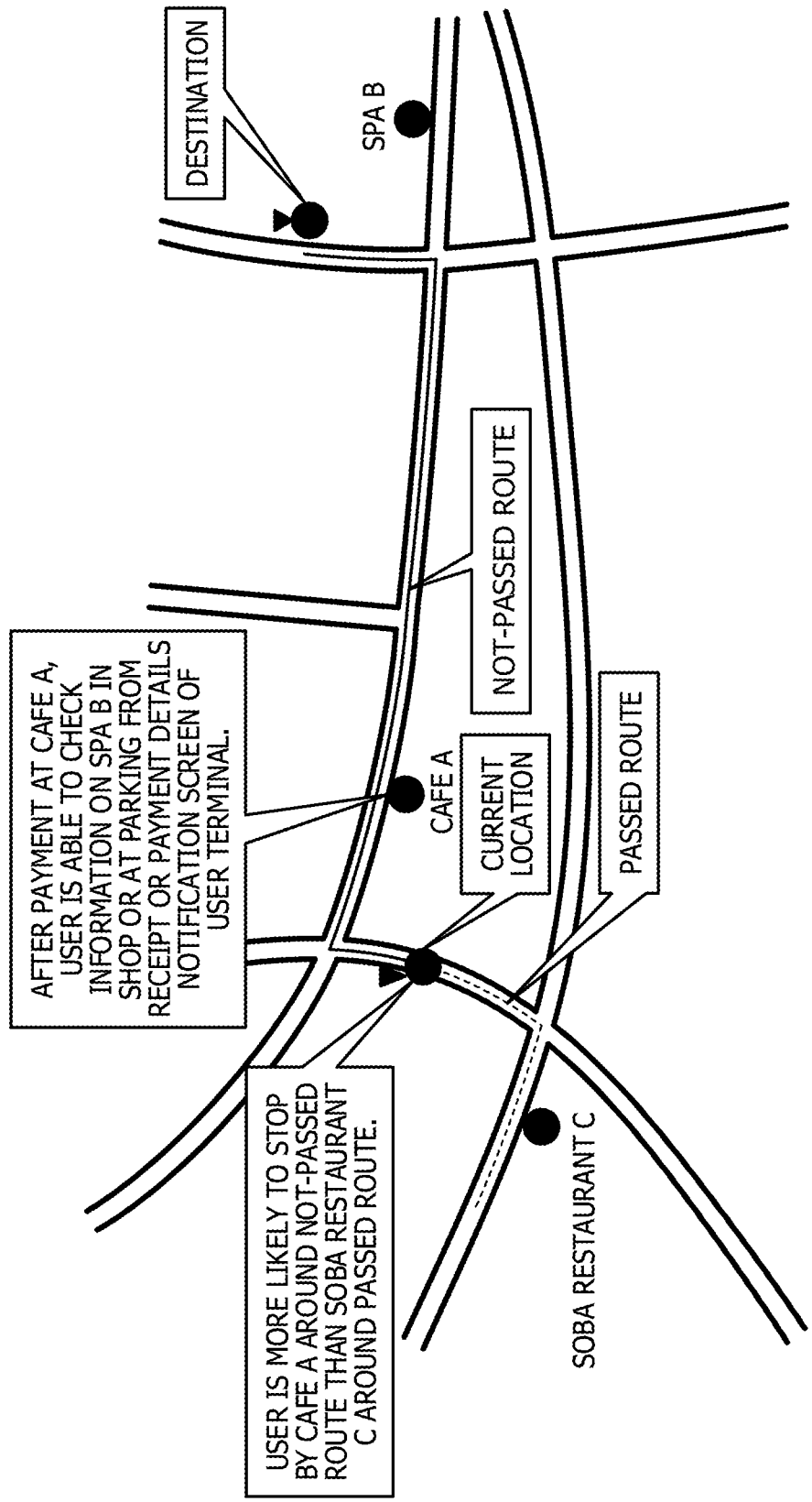
FIG. 6 is a diagram for describing matching according to Embodiment 1.

FIG. 6 is a diagram for describing matching according to Embodiment 1. In the example of FIG. 6, the specification section 91 specifies the cafe A as the first shop or the first facility. In addition, the specification section 91 specifies the spa B as the second shop or the second facility. Then, when the user makes payment at the cafe A, the specification section 91 outputs the information on the spa B through the receipt or the payment details notification screen.

Although moving to the destination by an automobile, the user is able to check the information on the spa B in the cafe A or at a parking, and this allows the user to safely, without traveling, set the spa B as the stop-by point in a car navigation system and the like.

The specification section 91 does not specify a soba restaurant C around a point where the user terminal 20 already passed, that is, a passed route, as the first shop or the first facility. The specification section 91 specifies the cafe A around the point where the user terminal 20 has not passed yet, that is, a not-passed route, as the first shop or the first facility. This makes it possible to specify a shop or a facility that the user is more likely to stop by as the first shop or the first facility. Also, this allows the user to stop by the first shop or the first facility without driving back the way. In addition, this makes it possible to reduce the load on the device due to the processing for specifying the first shop or the first facility.

According to this embodiment, the shops or the facilities are thus able to draw much more customers. Also, when the user is on the route to the destination or stops by a shop or a facility around the route, the user is able to get information (for example, coupon) on a shop or a facility where the user may stop by easily by making a little change in the route to the destination. Accordingly, the user is able to know existence of additional enjoyable shops or facilities without ruining the visit to the intended destination.

Embodiment 2

[System Configuration]

Figure 7:
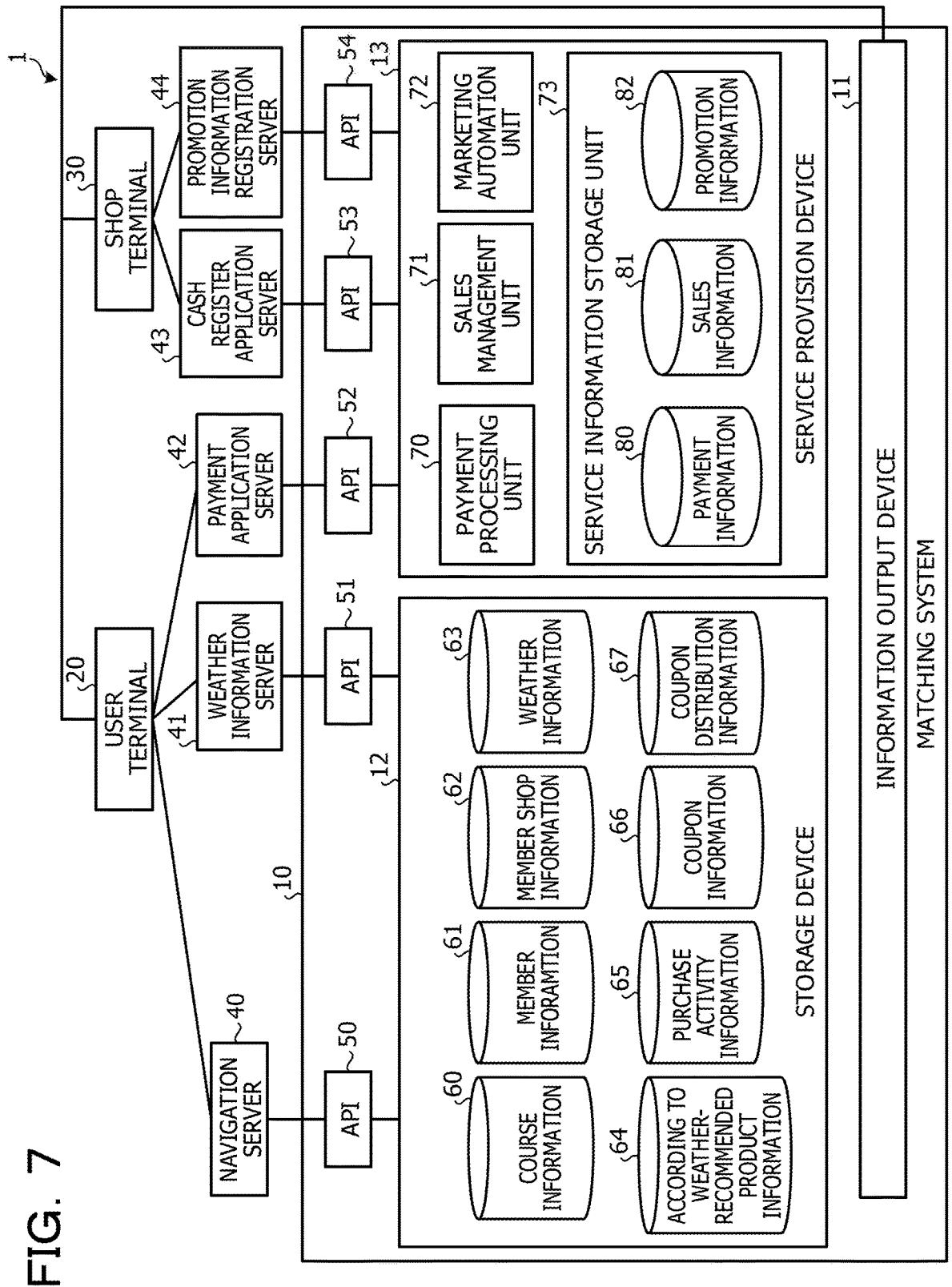
FIG. 7 is a diagram that illustrates an exemplary schematic configuration of a system according to Embodiment 2.

Next, the exemplary system 1 according to Embodiment 2 is described. FIG. 7 is a diagram that illustrates an exemplary schematic configuration of the system according to Embodiment 2. In this embodiment, an example in which the system 1 provides the user with information on a shop including privilege information (for example, coupon) is described, for example. Note that the shop may include not only a shop for selling products but also a facility for providing services such as a movie theater and a spa.

As illustrated in FIG. 7, the system 1 has the matching system 10, the user terminal 20, the shop terminal 30, the navigation server 40, a weather information server 41, the payment application server 42, the cash register application server 43, and a promotion information registration server 44. Hereinafter, unless otherwise stated, an element denoted by the same figure number as that in FIG. 1 has the similar function as that in FIG. 1, and a description thereof is omitted.

The matching system 10 is connected with the user terminal 20, the shop terminal 30, the navigation server 40, the weather information server 41, the payment application server 42, the cash register application server 43, and the promotion information registration server 44. The user terminal 20 is connected with the navigation server 40, the weather information server 41, and the payment application server 42. The shop terminal 30 is connected with the cash register application server 43 and the promotion information registration server 44. Each server is a computer.

As described above, via the application, the user receives the route search service from the navigation server 40, for example. Via the application, the user receives the payment service from the payment application server 42, for example.

In addition, via the application, the user receives a weather information provision service from the weather information server 41, for example. When the user receives the weather information provision service, the user terminal 20 transmits to the weather information server 41 information for identifying the user, the coordinates of the current location, and the like, for example. The weather information server 41 then transmits to the user terminal 20 information on weather of the acquired current location, for example. Note that the information on the weather includes a category of weather such as sunny, cloudy, and rainy, humidity, temperature, and the like, for example.

As described above, via the application, the user of the shop terminal 30 receives the sales management service from the cash register application server 43, for example.

In addition, via the application, the user of the shop terminal 30 receives a promotion service from the promotion information registration server 44, for example. When a shop receives the promotion service, the shop terminal 30 transmits to the promotion information registration server 44 information for identifying the shop, information on a promotion target product, a condition for setting a product as the promotion target, and the like, for example. The promotion information registration server 44 then provides a different system providing the promotion service with the information transmitted from the shop terminal 30, for example. In this embodiment, the promotion information registration server 44 provides the matching system 10 with the information, for example.

[Configuration of Matching System 10]

Next, a configuration of the matching system 10 according to Embodiment 2 is described. As illustrated in FIG. 7, the matching system 10 has the information output device 11, the storage device 12, the service provision device 13, and application programming interfaces (APIs) 50 to 54.

The matching system 10 uses the APIs 50 to 54 to acquire data from the corresponding servers providing the services. For example, the matching system 10 uses the API 50 to acquire from the navigation server 40 information on the current location, the destination, and the route of a predetermined user. For example, the matching system 10 uses the API 51 to acquire from the weather information server 41 information on weather of a predetermined point.

For example, the matching system 10 uses the API 52 to acquire from the payment application server 42 information on payment of a predetermined user. For example, the matching system 10 uses the API 53 to acquire from the cash register application server 43 information on sales at a predetermined shop. For example, the matching system 10 uses the API 54 to acquire from the promotion information registration server 44 information on promotion at a predetermined shop.

The storage device 12 stores the course information 60, member information 61, the member shop information 62, weather information 63, according to weather-recommended product information 64, purchase activity information 65, coupon information 66, and coupon distribution information 67.

The course information 60 is the data that stores the information on the location and the route of the user. For example, the course information 60 stores the information on the current location, the destination, and the route of the user.

Note that the course information 60 may store the information by allowing the API 50 to regularly acquire the data from the navigation server 40. In addition, the course information 60 may store the information by allowing the navigation server 40 to notify the matching system 10 of the route search result when the navigation server 40 provides the user with the route search service.

FIG. 8 is a diagram that illustrates an exemplary data configuration of the course information. As illustrated in FIG. 8, the course information 60 has items such as "member ID", "current location coordinates", "destination coordinates", and "route". Note that these items of the course information 60 illustrated in FIG. 8 are an example, and another item may be provided.

The item of the member ID is a region that stores an ID for identifying the user. The item of the member ID stores the member ID of each user set in advance. The item of the current location coordinates is a region that stores the coordinates of the current location of the user. The item of the destination coordinates is a region that stores the coordinates of the destination of the user. The item of the route is a region that stores the route from the current location to the destination. The item of the route stores data that indicates the route from the current location to the destination of the user of which the member ID is stored in the item of the member ID. Note that the data stored in the course information 60 is, for example, the data acquired from the navigation server 40 by the API 50.

Referring back to FIG. 7, the member information 61 is data that stores information on an attribute of the user. For example, the member information 61 stores information on the attribute such as gender and age of the user.

Note that the information may be registered in advance in the member information 61 by a manager and the like before the matching system 10 provides the service. The member information 61 may store the information that the user inputted to the application of the user terminal 20, at a timing when the user registers for the membership and the like to receive the information and the service from the matching system 10. The information stored in the member information 61 may be updated based on information regularly collected from the user terminal 20 and the like.

Figure 9:
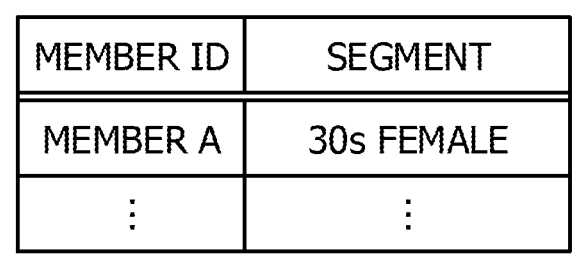

FIG. 9 is a diagram that illustrates an exemplary data configuration of the member information. As illustrated in FIG. 9, the member information 61 has items such as "member ID" and "segment". Note that these items of the member information 61 illustrated in FIG. 9 are an example, and another item may be provided.

The item of the member ID is a region that stores the ID for identifying the user. The item of the segment is a region that stores a category based on the attribute of the user. The item of the segment stores a segment categorized in terms of gender and age of the user of which the member ID is stored in the item of the member ID.

Referring back to FIG. 7, the member shop information 62 is the data that stores the information on the member shop. For example, the member shop information 62 stores the information on the location of the member shop and the customer image as a target.

Note that the information may be registered in advance in the member shop information 62 by the manager and the like before the matching system 10 provides the service. The information stored in the member shop information 62 may be updated based on information regularly collected from the shop terminal 30 and the like.

FIG. 10 is a diagram that illustrates an exemplary data configuration of the member shop information. As illustrated in FIG. 10, the member shop information 62 has items such as "member shop ID", "coordinates", "target customer image", and "coupon ID". Note that these items of the member shop information 62 illustrated in FIG. 10 are an example, and another item may be provided.

The item of the member shop ID is a region that stores an ID for identifying the member shop. The item of the member shop ID stores a member shop ID of each member shop set in advance. The item of the coordinates is a region that stores coordinates of the address of the member shop. The item of the target customer image is a region that stores a customer image as a target of the member shop. The item of the target customer image stores the segment of the customer as the target of the member shop of which the member shop ID is stored in the item of the member shop ID. Note that the segment to be stored in the item of the target customer image corresponds to the segment of the member information 61. The item of the coupon ID is a region that stores an ID of a coupon available at the member shop. The item of the coupon ID stores the ID of the coupon available at the member shop of which the member shop ID is stored in the item of the member shop ID.

Referring back to FIG. 7, the weather information 63 is data that stores information on weather. For example, the weather information 63 stores information on weather of a predetermined location.

Note that the weather information 63 may store the information by allowing the API 51 to regularly acquire the data from the weather information server 41. The weather information 63 may store the information by allowing the API 51 to acquire the data from the weather information server 41 at a timing when the user receives the route search service.

FIG. 11 is a diagram that illustrates an exemplary data configuration of the weather information. As illustrated in FIG. 11, the weather information 63 has items such as "coordinates", "temperature", "humidity", "category", and "weather pattern". Note that these items of the weather information 63 illustrated in FIG. 11 are an example, and another item may be provided.

The item of the coordinates is a region that stores coordinates of a predetermined location. The item of the temperature, the item of the humidity, and the item of the category are regions that store temperature, humidity, and a category of weather, respectively. The item of the temperature, the item of the humidity, and the item of the category store the temperature, the humidity, and the category of weather of the coordinates stored in the item of the coordinates, respectively. The item of the weather pattern is a region that stores a pattern of weather. The item of the weather pattern stores a value that indicates the pattern of weather categorized based on the temperature, the humidity, the category of weather, and the like. Note that the temperature, the humidity, and the category of weather are, for example, the data acquired from the weather information server 41 by the API 51. The weather pattern may be a value calculated by the matching system 10 based on the acquired temperature, humidity, and the category of weather, and a determination criterion set in advance.

Referring back to FIG. 7, the according to weather-recommended product information 64 is data that stores information on a product that is recommended to be sold according to weather at each member shop. For example, the according to weather-recommended product information 64 stores a recommended product according to the weather pattern of each member shop.

Note that the information may be registered in advance in the according to weather-recommended product information 64 by the manager and the like before the matching system 10 provides the service. The information stored in the according to weather-recommended product information 64 may be updated based on the information regularly collected from the shop terminal 30 and the like.

FIG. 12 is a diagram that illustrates an exemplary data configuration of the according to weather-recommended product information. As illustrated in FIG. 12, the according to weather-recommended product information 64 has items such as "member shop ID", "weather pattern", and "product". Note that these items of the according to weather-recommended product information 64 illustrated in FIG. 12 are an example, and another item may be provided.

The item of the member shop ID is the region that stores the ID for identifying the member shop. The item of the weather pattern is the region that stores the weather pattern categorizing weather. The item of the product is a region that stores the recommended product according to the weather pattern. The item of the product stores the recommended product according to the weather pattern stored in the item of the weather pattern of the member shop of which the member shop ID is stored in the item of the member shop ID.

Referring back to FIG. 7, the purchase activity information 65 is data that stores information on a purchase activity of the user. For example, the purchase activity information 65 stores a category of a product that the user often buys at each type of the shops.

Note that the information may be registered in advance in the purchase activity information 65 by the manager and the like before the matching system 10 provides the service. The information stored in the purchase activity information 65 may be updated based on the information regularly collected from the payment information 80 and the like.

FIG. 13 is a diagram that illustrates an exemplary data configuration of the purchase activity information. As illustrated in FIG. 13, the purchase activity information 65 has items such as "member ID", "type", and "product". Note that these items of the purchase activity information 65 illustrated in FIG. 13 are an example, and another item may be provided.

The item of the member ID is the region that stores the ID for identifying the user. The item of the type is a region that stores a categorized type of the member shop. The item of the product is a region that stores the product the user often buys for each type of the member shops. The item of the product stores a product that the user, of which the member ID is stored in the item of the member ID, frequently buys for each type of the member shops, which is stored in the type.

Referring back to FIG. 7, the coupon information 66 is data that stores information on a coupon. For example, the coupon information 66 stores the information on the coupon content.

Note that the information may be registered in advance in the coupon information 66 by the manager and the like before the matching system 10 provides the service. The information stored in the coupon information 66 may be updated based on the information regularly collected from the shop terminal 30 and the like.

FIG. 14 is a diagram that illustrates an exemplary data configuration of the coupon information. As illustrated in FIG. 14, the coupon information 66 has items such as "coupon ID", "coupon-applicable product", "discount amount", and "available period". Note that these items of the coupon information 66 illustrated in FIG. 14 are an example, and another item may be provided.

The item of the coupon ID is a region that stores an ID for identifying a coupon. The item of the coupon ID stores an ID that is set when issuing the coupon. The item of the coupon-applicable product is a region that stores a product to which the coupon is applicable. The item of the discount amount is a region that stores a discount amount using the coupon. The item of the available period is a region that stores a period in which the coupon is available.

Referring back to FIG. 7, the coupon distribution information 67 is data that stores information on the distributed coupon. For example, the coupon distribution information 67 stores information on the user to which the coupon is distributed and a status of use of the coupon.

Note that information on the coupon may be registered in the coupon distribution information 67 at a timing when the user decides the coupon distributed through the coupon distribution processing. The information stored in the coupon distribution information 67 may be properly updated at a timing when the user uses the coupon, for example.

FIG. 15 is a diagram that illustrates an exemplary data configuration of the coupon distribution information. As illustrated in FIG. 15, the coupon distribution information 67 has items such as "coupon ID", "member ID", "coupon-provider member shop ID", "promoted product", "coupon-use member shop ID", "coupon-applicable product", "discount amount", "available period", "use", and "payment No". Note that these items of the coupon distribution information 67 illustrated in FIG. 15 are an example, and another item may be provided.

The item of the coupon ID is the region that stores the ID for identifying the coupon. The coupon ID stores the ID that is set when issuing the coupon. The item of the member ID is the region that stores the ID for identifying the user. The item of the coupon-provider member shop ID is a region that stores an ID for identifying a member shop that provides the coupon. The item of the promoted product is a region that stores the product as the promotion target at the member shop that provides the coupon. The item of the coupon-use member shop ID is a region that stores an ID for identifying a member shop for which the coupon is available. The item of the coupon-applicable product is the region that stores the product to which the coupon is applicable. The item of the discount amount is the region that stores the discount amount using the coupon. The item of the available period is the region that stores the period in which the coupon is available. The item of the use is a region that stores whether the coupon is already used. The payment No is a region that stores a number for identifying the payment using the coupon.

Referring back to FIG. 7, the service provision device 13 has the payment processing unit 70, the sales management unit 71, a marketing automation unit 72, and the service information storage unit 73. The service information storage unit 73 stores the payment information 80, the sales information 81, and promotion information 82.

The payment processing unit 70 stores into the payment information 80 the information on payment of the user acquired through the API 52. The sales management unit 71 stores into the sales information 81 the information on sales at the shop acquired through the API 53.

The marketing automation unit 72 acquires information on the promotion at the shop acquired through the API 54, and determines whether the shop is the promotion target and stores into the promotion information 82 the information on the promotion with the determination result.

The payment information 80 is the data that stores the information on payment of the user. For example, the payment information 80 stores the information on the member shop where the user purchased something, a price of the purchased product, and the like.

Note that the payment information 80 may store the information by allowing the API 52 to regularly acquire the data from the payment application server 42. The payment information 80 may store the information by allowing the payment application server 42 to notify the matching system 10 of the information on payment when the payment application server 42 provides the member shop with the payment processing service.

FIG. 16 is a diagram that illustrates an exemplary data configuration of the payment information. As illustrated in FIG. 16, the payment information 80 has items such as "payment No", "member ID", "member shop ID", "product", "price", and "coupon ID". Note that these items of the payment information 80 illustrated in FIG. 16 are an example, and another item may be provided.

The item of the payment No is a region that stores a number for identifying the payment. The item of the payment No stores a serial number issued when the payment is made. The item of the member ID is the region that stores the ID for identifying the user. The item of the member shop ID is the region that stores the ID for identifying the member shop. The item of the product is a region that stores a product as the payment target. The item of the price is a region that stores the payment amount. The item of the coupon ID is a region that stores an ID for identifying the coupon used at the payment. Note that the data stored in the payment information 80 is, for example, the data acquired from the payment application server 42 by the API 52.

Referring back to FIG. 7, the sales information 81 is the data that stores the information on sales at the member shop. For example, the sales information 81 stores a price of the product of which the payment is made at the member shop.

Note that the sales information 81 may store the information by allowing the API 53 to regularly acquire the data from the cash register application server 43. The sales information 81 may store the information by allowing the cash register application server 43 to notify the matching system 10 of the information on sales when the cash register application server 43 provides the member shop with the sales management service.

FIG. 17 is a diagram that illustrates an exemplary data configuration of the sale information. As illustrated in FIG. 17, the sales information 81 has items such as "payment No", "member shop ID", "product", "price", and "coupon ID". Note that these items of the sales information 81 illustrated in FIG. 17 are an example, and another item may be provided.

The item of the payment No is the region that stores the number for identifying the payment. The item of the member shop ID is the region that stores the ID for identifying the member shop. The item of the product is the region that stores the product as the payment target. The item of the price is the region that stores the payment amount. The item of the coupon ID is the region that stores the ID for identifying the coupon used at the payment. Note that the data stored in the sales information 81 is, for example, the data acquired from the cash register application server 43 by the API 53.

Referring back to FIG. 7, the promotion information 82 is data that stores information on promotion at the member shop. For example, the promotion information 82 stores the product as the promotion target at the member shop.

Note that the promotion information 82 may store the information by allowing the API 54 to regularly acquire the data from the promotion information registration server 44. The promotion information 82 may store the information by allowing the promotion information registration server 44 to notify the matching system 10 of the information on the promotion when this information is registered in the promotion information registration server 44.

FIG. 18 is a diagram that illustrates an exemplary data configuration of the promotion information. As illustrated in FIG. 18, the promotion information 82 has items such as "member shop ID", "product", "automatic promotion implementation condition", and "automatic promotion implementation flag". Note that these items of the promotion information 82 illustrated in FIG. 18 are an example, and another item may be provided.

The item of the member shop ID is the region that stores the ID for identifying the member shop. The item of the product is the region that stores the product as the promotion target. The item of the automatic promotion implementation condition is a region that stores a condition for turning ON an automatic promotion implementation flag. The item of the automatic promotion implementation flag is a region that stores a flag that is turned ON when the automatic promotion implementation condition is met. Note that the data stored in the promotion information 82 is, for example, the data acquired from the promotion information registration server 44 by the API 54.

[Coupon Distribution Processing]

Here, operations of the sections of the information output device 11 and the coupon distribution processing are described. The information output device 11 provides the user with a coupon of the member shop around the route of the user combined with information on the member shop not around the route of the user. The information output device 11 is an exemplary information output system.

The acquisition section 90 of the information output device 11 illustrated in FIG. 2 acquires route information, which is a search result of the destination set via the user terminal 20. The specification section 91 refers to the shop information, which is stored in the storage device 12 in association with at least one of the location information and the privilege information, and specifies the first shop having a predetermined locational relationship with the route and the second shop having no predetermined locational relationship with the route. The distribution section 92 transmits to the user terminal 20 combined information in which the privilege information on the first shop and the information on the second shop are combined.

The coupon distribution processing by the information output device 11 is executed at a timing when a predetermined distribution condition is met. The predetermined distribution condition may be, for example, to detect that the user performed the route search to the destination based on the data that the API 50 allowed to regularly acquire from the navigation server 40.

The application of the user terminal 20 may have a function to notify the matching system 10 of that the user performed the route search, and when the notification is made by such a function, the matching system 10 may thus determine that the distribution condition is met. It is also possible to employ a configuration in which the application of the user terminal 20 is provided with a function to notify the matching system 10 of the current location of the user terminal 20, and when the notification is made by such a function, the API 50 is allowed to acquire the data on the user from the navigation server 40, and when the acquired data indicates that the user performed the route search, it is determined that the distribution condition is met.

When the distribution condition is met, first, the acquisition section 90 refers to the course information 60 and acquires the route information, that is, the current location coordinates, the destination coordinates, and the route of the user. Next, the acquisition section 90 refers to the member shop information 62 and acquires member shops around the acquired route and around the acquired destination. The acquisition section 90 then refers to the member information 61 and the member shop information 62 and determines whether there is a member shop having a target customer image that matches the segment of the user.

At this point, when there is the member shop having a target customer image that matches the segment of the user, the acquisition section 90 refers to the weather information 63 and acquires the weather pattern of the current location of the user. The acquisition section 90 then refers to the according to weather-recommended product information 64 and, according to the acquired weather pattern, acquires a recommended product of the member shop having a target customer image that matches the segment of the user. The acquisition section 90 then refers to the purchase activity information 65 and acquires a product that the user often buys at each type of the member shops.

At this point, based on the acquired recommended product and the product that the user often buys, the acquisition section 90 narrows the products down to the coupon-applicable target. The acquisition section 90 then refers to the promotion information 82 and determines whether there is a member shop as the promotion target, that is, a member shop holding a product that the automatic promotion implementation flag is ON.

At this point, when there is the member shop as the promotion target, the specification section 91 specifies a coupon to be distributed. In specific, out of the member shops having a target customer image that matches the segment of the user, the specification section 91 specifies a promotion target member shop not around the route but around the destination as a coupon-provider member shop. Meanwhile, out of the member shops having a target customer image that matches the segment of the user, the specification section 91 specifies a member shop around the route as a coupon-use member shop and specifies the product narrowed down to the coupon-applicable target by the acquisition section 90 as a coupon-applicable target product. Moreover, the specification section 91 refers to the member shop information 62 and the coupon information 66 and specifies a coupon corresponding to the coupon-use member shop and the coupon-applicable product.

In this case, the coupon-use member shop is the exemplary first shop having the predetermined locational relationship with the route. The coupon-provider member shop is the exemplary second shop having no predetermined locational relationship with the route. The member shop information 62 stores the location information and the privilege information as well as the shop information associated with the former two.

Note that the specification section 91 may specify multiple coupon-provider member shops, coupon-use member shops, and the coupon-applicable target products. In addition, in this case, multiple types of coupons may be distributed to the user.

The distribution section 92 distributes to the user terminal 20 the coupon specified by the specification section 91 combined with the information on the specified coupon-provider member shop and the promotion of the promoted product. When the user decides a desired coupon out of the distributed coupons, the information on that coupon decided by the user is registered in the coupon distribution information 67. Note that the matching system 10 may be notified that the user has decided the coupon by, for example, the user terminal 20 via the application.

Here, the coupon distribution processing is described with a specific example. First, the acquisition section 90 refers to the course information 60 and acquires the current location coordinates "E180/N260", the destination coordinates "E185/N265", and the route "route 1" of the user "member A". Next, the acquisition section 90 refers to the member shop information 62 and acquires the member shop around the route "convenience store A" and member shops around the destination "super public bath B", "movie theater C", and "supermarket D". The acquisition section 90 then refers to the member information 61 and the member shop information 62 and determines whether there is a member shop having a target customer image that matches the segment "30s female" of the user "member A". In this case, the member shops "convenience store A", "super public bath B", "movie theater C", and "supermarket D" match the segment "30s female".

At this point, the acquisition section 90 refers to the weather information 63 and acquires the weather pattern "A" of the current location "E180/N260" of the user "member A". The acquisition section 90 then refers to the according to weather-recommended product information 64 and acquires the recommended product "barley tea, ice coffee, lemon tea, sports drink, stick ice cream" of the member shop "convenience store A". The acquisition section 90 then refers to the purchase activity information 65 and acquires the product "teas, water, snack" that the user "member A" often buys at the type "convenience store".

At this point, based on the acquired recommended product "barley tea, ice coffee, lemon tea, sports drink, stick ice cream" and the product that the user often buys "teas, water, snack", the acquisition section 90 narrows the products down to "barley tea, lemon tea" as the coupon-applicable target. The acquisition section 90 then refers to the promotion information 82 and determines whether there is a member shop holding a product that the automatic promotion implementation flag is ON. In this case, the automatic promotion implementation flag of "first-run movie A" of the member shop "movie theater C" is ON.

At this point, the specification section 91 specifies the coupon distribution member shop as "movie theater C". In addition, the specification section 91 specifies the coupon-use member shop as "convenience store A" and specifies the coupon-applicable target product as "barley tea, lemon tea". Moreover, the specification section 91 refers to the member shop information 62 and the coupon information 66 and specifies the coupon corresponding to the coupon-use member shop and the coupon-applicable product as "A0123".

The distribution section 92 distributes to the user terminal 20 of the user "member A" the coupon "A0123" in which the coupon-provider member shop as "movie theater C", the coupon-use member shop as "convenience store A", and the promoted product as "first-run movie A".

Figure 19:
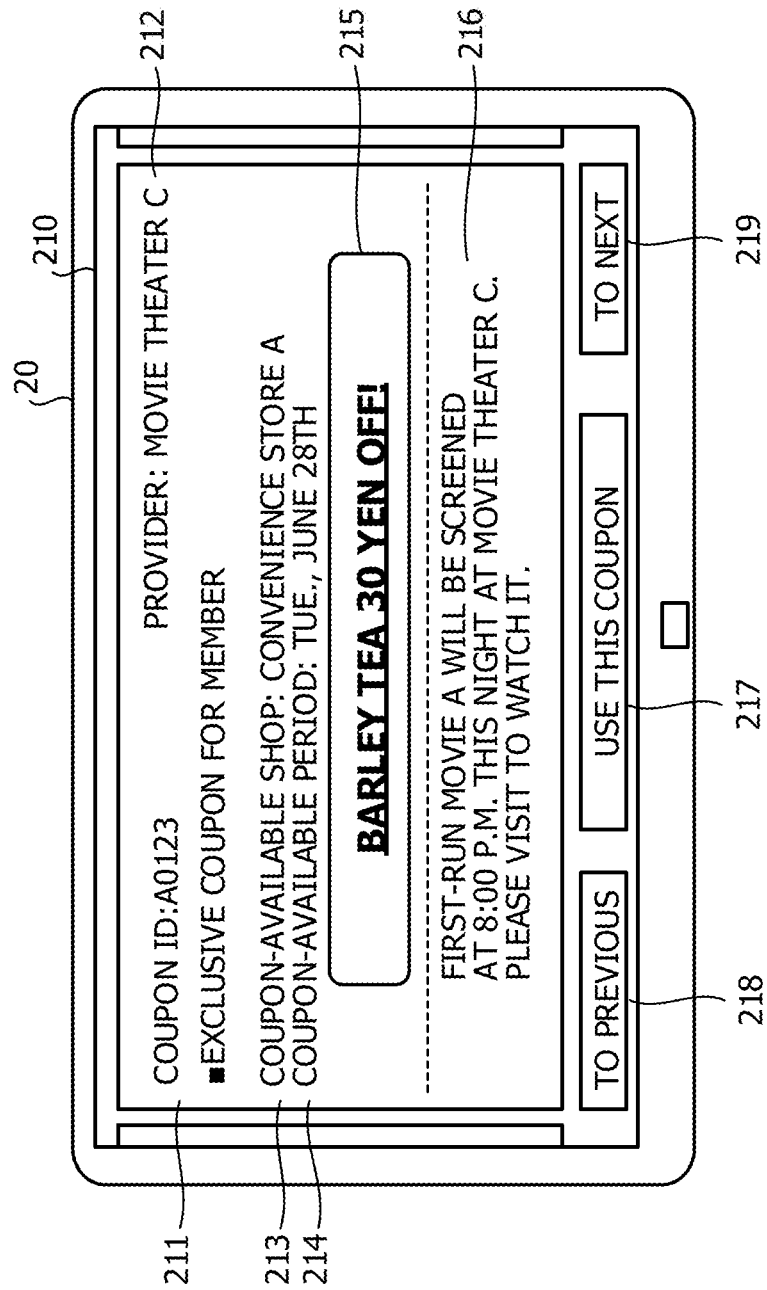
FIG. 19 is a diagram that illustrates an exemplary coupon distribution screen according to Embodiment 2.

FIG. 19 is a diagram that illustrates an exemplary coupon distribution screen according to Embodiment 2. As illustrated in FIG. 19, a coupon distribution screen 210 displayed on the user terminal 20 has a coupon ID display region 211 that displays the coupon ID of the coupon, a coupon-provider member shop display region 212 that displays the coupon-provider member shop of the coupon, a coupon-use member shop display region 213 that displays the coupon-use member shop of the coupon, an available period display region 214 that displays the available period of the coupon, a coupon content display region 215 that displays the content of the coupon, that is, the coupon-applicable product and the discount amount, and a promotion region 216 that is a region for displaying the information on the coupon-provider member shop and the promotion of the promoted product.

In the example of FIG. 19, the coupon distribution screen 210 indicates that the coupon with the coupon ID "A0123" is distributed while the coupon-provider member shop is "movie theater C". The coupon distribution screen 210 also indicates that the coupon-use member shop of the distributed coupon is "convenience A", the available period is "Tue., June 28th", and the content that a barley tea is discounted by 30 yen. In addition, the coupon distribution screen 210 displays a promotion message about the promoted product "first-run movie A" of the coupon-provider member shop "movie theater C".

The coupon distribution screen 210 is provided with a decision button 217 displaying "use this coupon". When the user presses the decision button 217, the displayed coupon is decided. The coupon distribution screen 210 is also provided with a previous button 218 displaying "to previous" and a next button 219 displaying "to next". When the user presses the previous button 218 or the next button 219, a coupon different from the current coupon displayed on the coupon distribution screen 210 is displayed.

[Receipt Issue Processing]

In addition, when detecting a purchase activity using the combined information by the user associated with the user terminal 20 at the first shop, the information output device 11 performs receipt issue processing. In the receipt issue processing, the information output device 11 allows a terminal provided in the first shop to output a receipt including information on the payment details as a result of the purchase activity and information for introducing the second shop.

When detecting the purchase activity using the combined information by the user associated with the user terminal 20 at the first shop, that is, when there is a request to use the distributed coupon at the coupon-use member shop, the information output device 11 performs the receipt issue processing. In the receipt issue processing, the information output device 11 transmits to the shop terminal 30 of the coupon-use member shop the information on the coupon-provider member shop and the promotion of the promoted product and allows the shop terminal 30 to issue a receipt provided with a region displaying the transmitted information.

In this case, first, the acquisition section 90 refers to the coupon distribution information 67 and acquires data on the coupon requested to use. The distribution section 92 then transmits to the shop terminal 30 the data on the coupon acquired by the acquisition section 90 and instructs the shop terminal 30 to issue the receipt provided with the region displaying the information on the coupon-provider member shop and the promotion of the promoted product. At this point, for example, the distribution section 92 uses the API 53 to transmit the data to the shop terminal 30 and gives the instruction to the shop terminal 30 via the cash register application server 43.

Detection of the purchase activity using the combined information by the user associated with the user terminal 20 at the first shop may not have to be detection of the purchase activity due to the use of the distributed coupon. For example, instead of distributing the coupon, the distribution section 92 may distribute to the user terminal 20 screen information for receiving a reservation to buy a product at the first shop. In this case, it is possible to assume that the purchase activity using the combined information by the user associated with the user terminal 20 is detected, when the user terminal 20 receives the reservation operation to buy the product on the distributed screen information. Otherwise, it is possible to assume that the purchase activity using the combined information by the user associated with the user terminal 20 is detected, when it is detected that the reserved product is taken at the first shop.

Figure 20:
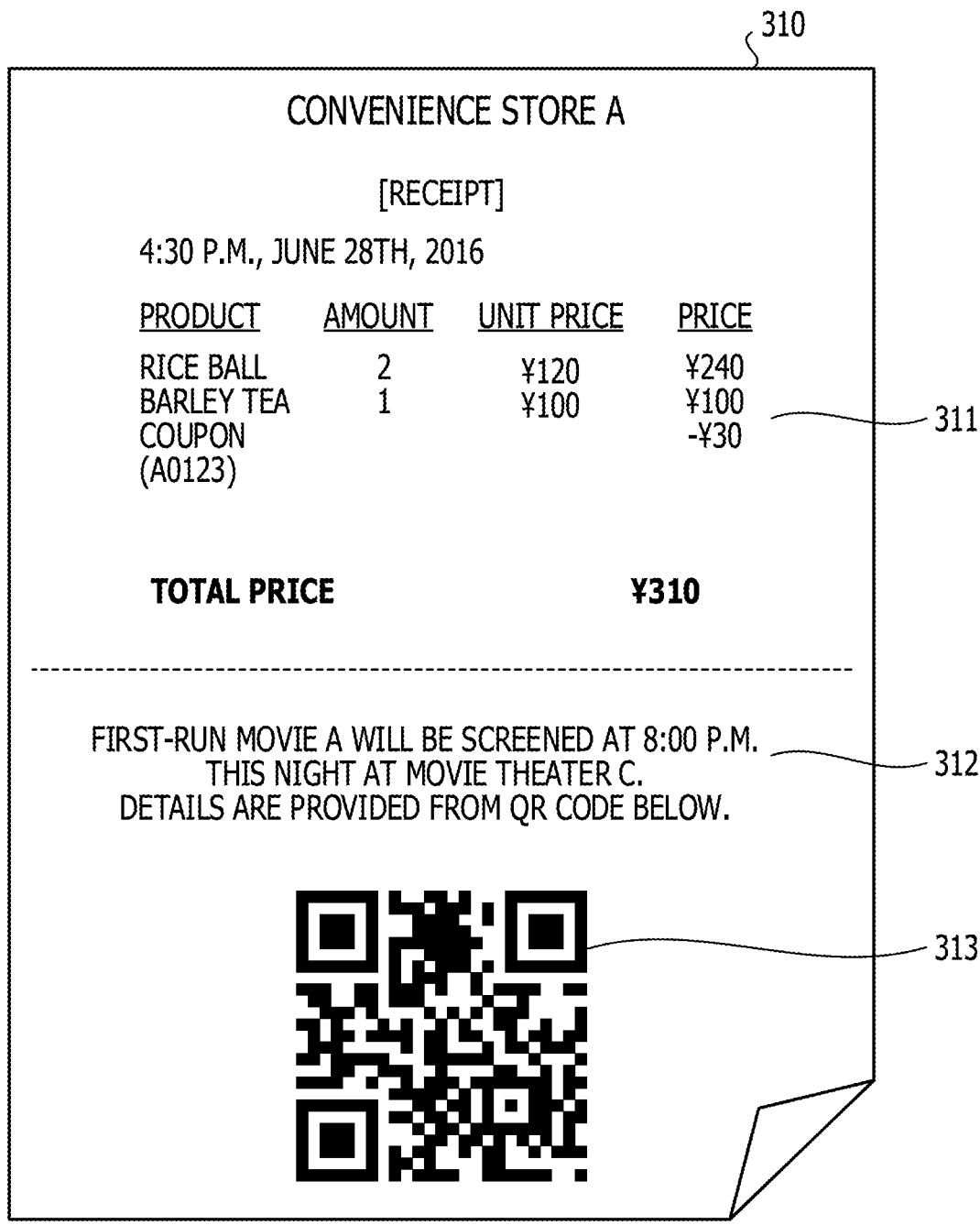
FIG. 20 is a diagram that illustrates an exemplary receipt according to Embodiment 2.

FIG. 20 is a diagram that illustrates an exemplary receipt according to Embodiment 2. As illustrated in FIG. 20, a receipt 310 issued by the shop terminal 30 has a sales information display region 311 that displays a product, an amount, a unit price, and a price of the sold product as exemplary information indicating payment details as a result of the purchase activity and displays the information on the used coupon. The receipt 310 has a promotion region 312 that is a region displaying the information on the coupon-provider member shop and the promotion of the promoted product as the exemplary information for introducing the second shop. The receipt 310 has a link display region 313 that displays a QR code indicating a URL of a website on which details of the coupon-provider member shop and the promoted product as the exemplary information for introducing the second shop are published.

In the example of FIG. 20, as the payment details, the receipt 310 indicates that two rice balls for 120 yen unit price and a barley tea of 100 yen unit price were purchased, the coupon "A0123" was used, and the total price was 310 yen at "convenience store A". In addition, the receipt 310 displays a promotion message about the promoted product "first-run movie A" of the coupon-provider member shop "movie theater C" with the QR code.

[Payment Details Notification Processing]

In addition, when detecting the purchase activity using the combined information by the user associated with the user terminal 20 at the first shop, the information output device 11 performs payment details notification processing. In the payment details notification processing, the information output device 11 transmits to the user terminal 20 a message including the information indicating the payment details at the first shop and the information for introducing the second shop.

When detecting the purchase activity using the combined information by the user associated with the user terminal 20 at the first shop, that is, payment in which the distributed coupon is used is performed, the information output device 11 performs the payment details notification processing. In the payment details notification processing, the information output device 11 transmits to the user terminal 20 the information on the coupon-provider member shop and the promotion of the promoted product and allows the user terminal 20 to display the payment details notification screen provided with a region displaying the transmitted information as a message.

In this case, first, the acquisition section 90 refers to the coupon distribution information 67 and acquires data on the coupon used in the payment. Next, the acquisition section 90 refers to the payment information 80 and acquires the data on the payment in which the coupon is used. The distribution section 92 then transmits to the user terminal 20 the data on the coupon and the data on the payment in which the coupon is used acquired by the acquisition section 90. The distribution section 92 then instructs the user terminal 20 to display the payment details notification screen provided with the region displaying the information on the coupon-provider member shop and the promotion of the promoted product as a message. At this point, for example, the distribution section 92 uses the API 52 to transmit the data to the user terminal 20 and gives the instruction to the user terminal 20 via the payment application server 42.

Figure 21:
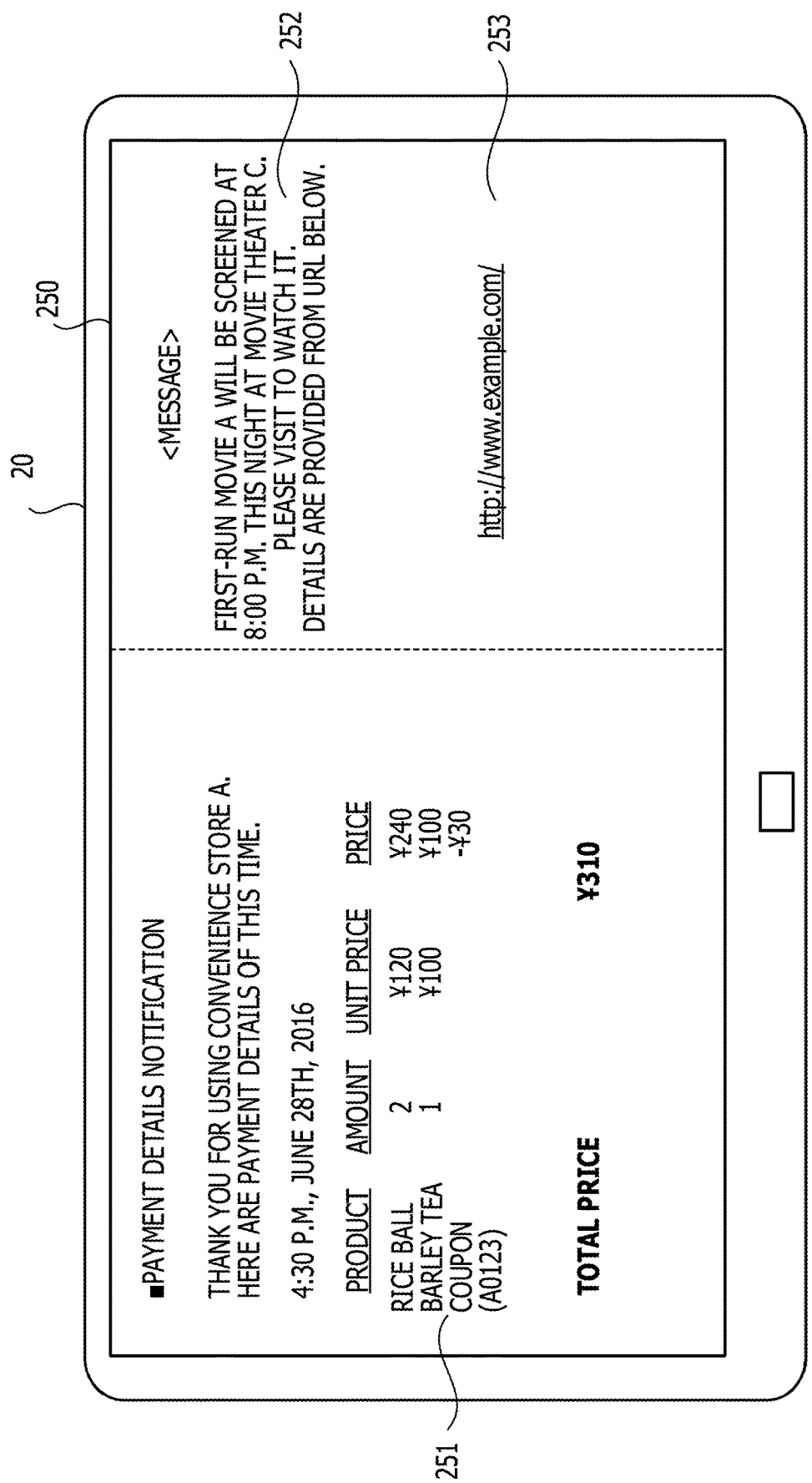
FIG. 21 is a diagram that illustrates an exemplary payment details notification screen according to Embodiment 2.

FIG. 21 is a diagram that illustrates an exemplary payment details notification screen according to Embodiment 2. As illustrated in FIG. 21, a payment details notification screen 250 displayed on the user terminal 20 has a payment information display region 251 that displays a product, an amount, a unit price, and a price of the paid product as exemplary information indicating the payment details at the first shop and information on the used coupon. The payment details notification screen 250 has a promotion region 252 that is a region displaying information on the coupon-provider member shop and the promotion of the promoted product as the exemplary information for introducing the second shop as a message. The payment details notification screen 250 has a link display region 253 that displays a URL of a website on which details of the coupon-provider member shop and the promoted product as the exemplary information for introducing the second shop are published.

In the example of FIG. 21, as the payment details, the payment details notification screen 250 indicates that two rice balls for 120 yen unit price and a barley tea for 100 yen unit price were purchased, the coupon "A0123" was used, and the total price was 310 yen at "convenience store A". In addition, the payment details notification screen 250 displays a promotion message about the promoted product "first-run movie A" of the coupon-provider member shop "movie theater C" with the URL.

[Processing Flow]

Figure 22:
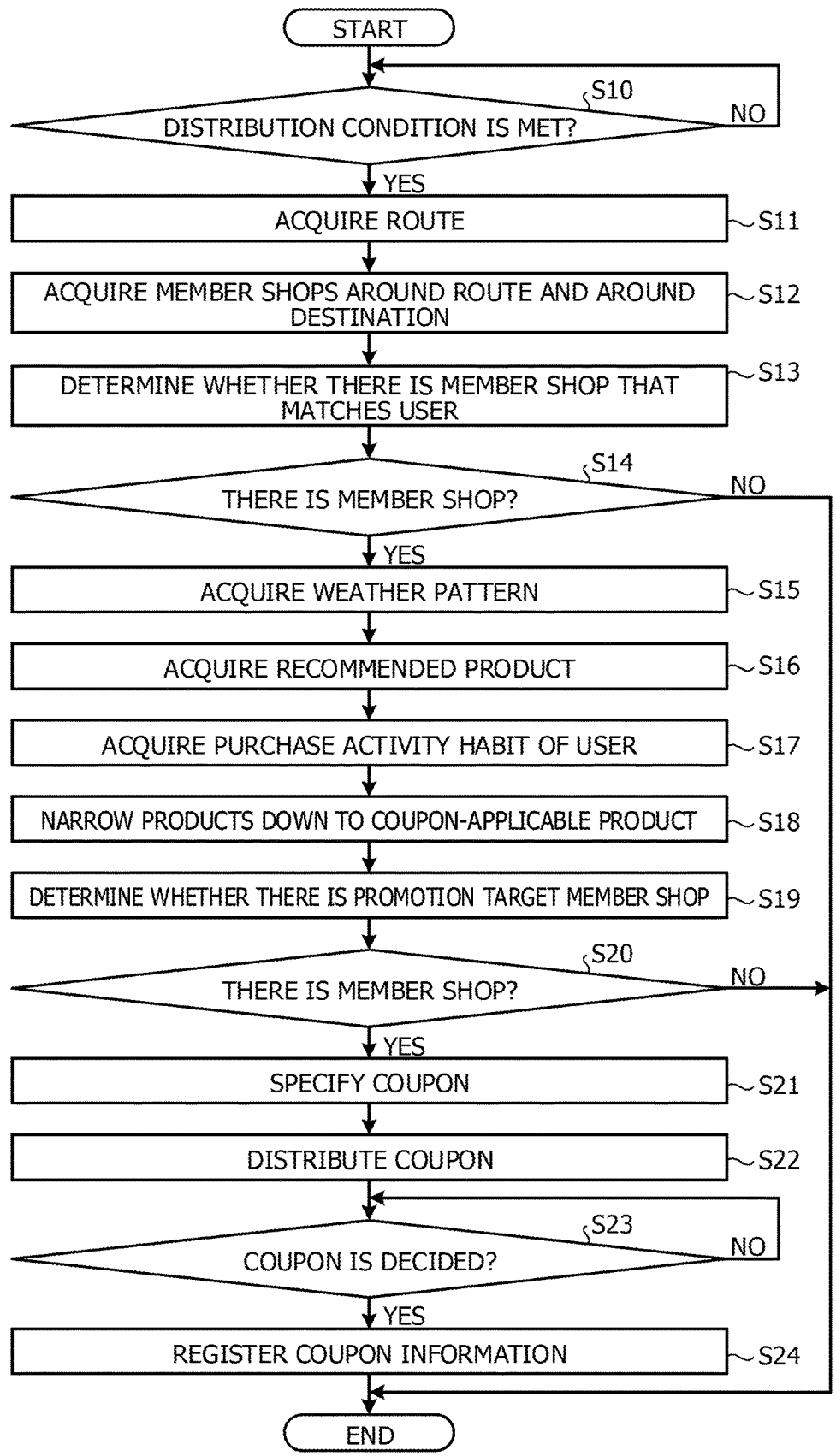
FIG. 22 is a flowchart that illustrates an exemplary procedure of coupon distribution processing according to Embodiment 2.

Next, a flow of the coupon distribution processing according to this embodiment is described. FIG. 22 is a flowchart that illustrates an exemplary procedure of the coupon distribution processing according to Embodiment 2. This coupon distribution processing is executed at the timing when the predetermined distribution condition is met (S10 Yes). Note that, when the predetermined distribution condition is not met (S10 No), the information output device 11 waits without executing the coupon distribution processing.

When the predetermined distribution condition is met, first, the acquisition section 90 refers to the course information 60 and acquires the current location coordinates, the destination coordinates, and the route of the user (S11). Next, the acquisition section 90 refers to the member shop information 62 and acquires member shops around the acquired route and destination (S12). The acquisition section 90 then refers to the member information 61 and the member shop information 62 and determines whether there is a member shop having a target customer image that matches the segment of the user (S13).

At this point, when there is the member shop having a target customer image that matches the segment of the user (S14 Yes), the acquisition section 90 refers to the weather information 63 and acquires the weather pattern of the current location of the user (S15). The acquisition section 90 then refers to the according to weather-recommended product information 64 and, according to the acquired weather pattern, acquires a recommended product of the member shop having a target customer image that matches the segment of the user (S16). The acquisition section 90 then refers to the purchase activity information 65 and acquires a product that the user often buys at each type of the member shops (S17). Note that, when there is no member shop having a target customer image that matches the segment of the user (S14 No), the information output device 11 ends the processing.

At this point, based on the acquired recommended product and the product that the user often buys, the acquisition section 90 narrows the products down to the coupon-applicable target (S18). The acquisition section 90 then refers to the promotion information 82 and determines whether there is a member shop as the promotion target, that is, a member shop holding a product that the automatic promotion implementation flag is ON (S19).

At this point, when there is the member shop as the promotion target (S20 Yes), the specification section 91 specifies a coupon to be distributed. In specific, out of the member shops having a target customer image that matches the segment of the user, the specification section 91 specifies a promotion target member shop around the destination as the coupon-provider member shop. Meanwhile, out of the member shops having a target customer image that matches the segment of the user, the specification section 91 specifies a member shop around the route as the coupon-use member shop and specifies the product narrowed down to the coupon-applicable target by the acquisition section 90 as the coupon-applicable target product (S21). Note that, when there is no promotion target member shop (S20 No), the information output device 11 ends the processing.

The distribution section 92 distributes the coupon specified by the specification section 91 to the user terminal 20 (S22). Then, when the user decides a desired coupon out of the distributed coupons (S23 Yes), the information on that coupon decided by the user is registered in the coupon distribution information 67 (S24). Note that, when no coupon is decided by the user (S23 No), the information output device 11 waits until a coupon is decided.

Note that the processing for specifying the coupon content, coupon-provider member shop, and coupon-use member shop is not limited to S15 to S20. For example, a member shop randomly selected from the member shops around the route may be the coupon-use member shop while a member shop randomly selected from the member shops around the destination may be the coupon-provider member shop.

S23 and S24 may not have to be executed. In this case, the information output device 11 distributes a coupon, and the distributed coupon may be managed by another device or a system.

Figure 23:
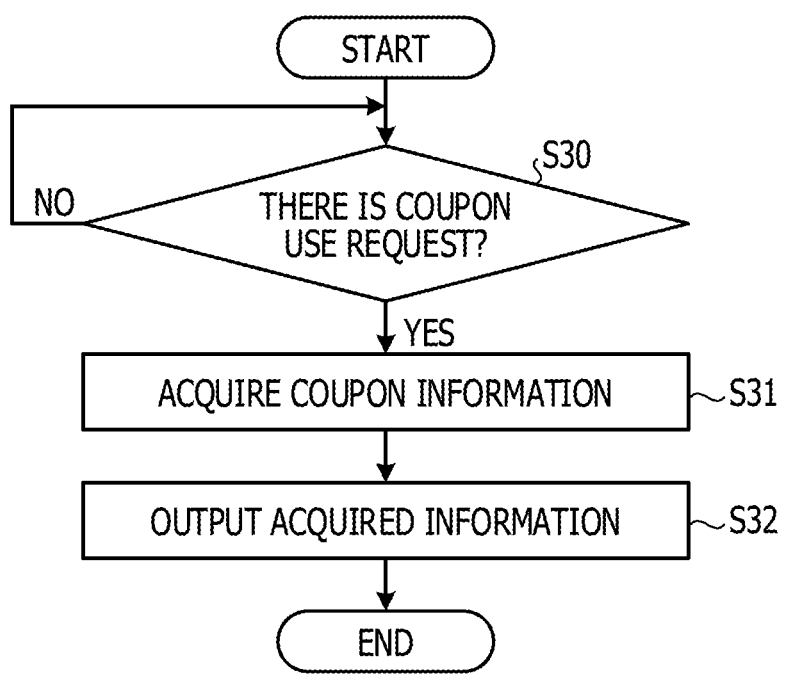
FIG. 23 is a flowchart that illustrates an exemplary procedure of receipt issue processing according to Embodiment 2.

Next, a flow of the receipt issue processing according to this embodiment is described. FIG. 23 is a flowchart that illustrates an exemplary procedure of the receipt issue processing according to Embodiment 2. This receipt issue processing is executed when there is a use request of the distributed coupon (S30 Yes). Note that, when there is no use request of the distributed coupon (S30 No), the information output device 11 waits without executing the receipt issue processing.

When there is the use request of the distributed coupon (S30 Yes), first, the acquisition section 90 refers to the coupon distribution information 67 and acquires the data on the coupon requested to be used (S31). The distribution section 92 then transmits to the shop terminal 30 the data on the coupon acquired by the acquisition section 90 and instructs the shop terminal 30 to issue the receipt provided with the region display the information on the coupon-provider member shop and the promotion of the promoted product (S32).

Figure 24:
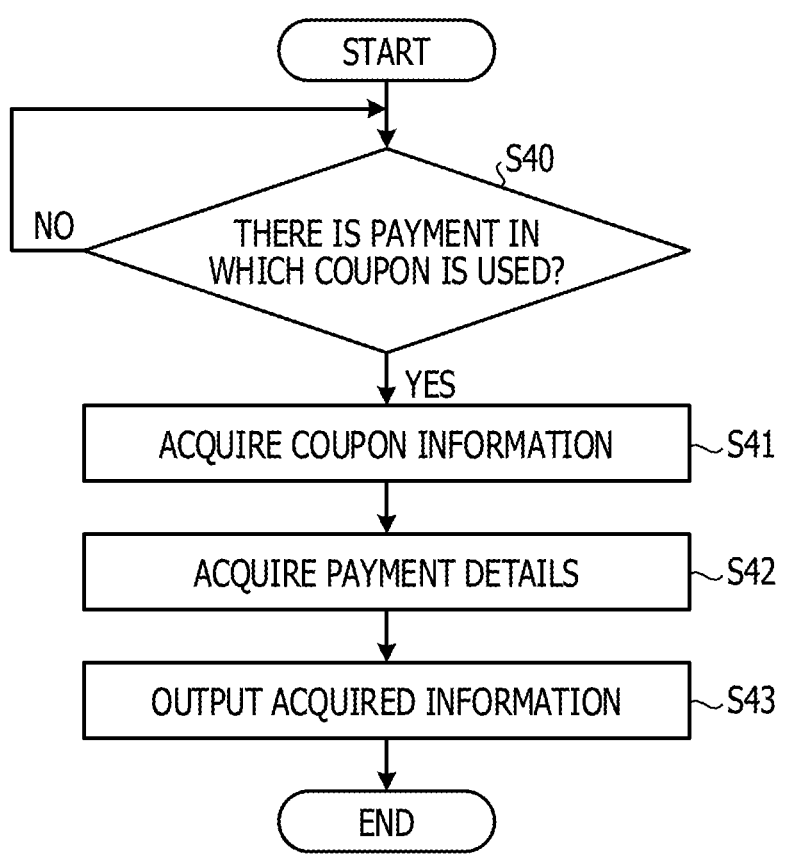
FIG. 24 is a flowchart that illustrates an exemplary procedure of payment details notification processing according to Embodiment 2.

Next, a flow of the payment details notification processing according to this embodiment is described. FIG. 24 is a flowchart that illustrates an exemplary procedure of the payment details notification processing according to Embodiment 2. This payment details notification processing is executed when the payment in which the distributed coupon is used is performed (S40 Yes). Note that, when there is no payment in which the distributed coupon is used (S40 No), the information output device 11 waits without executing the payment details notification processing.

When there is the payment in which the distributed coupon is used (S40 Yes), first, the acquisition section 90 refers to the coupon distribution information 67 and acquires the data on the coupon used in the payment (S41). Next, the acquisition section 90 refers to the payment information 80 and acquires the data on the payment in which the coupon is used (S42). The distribution section 92 then transmits to the user terminal 20 the data on the coupon and the data on the payment in which the coupon is used acquired by the acquisition section 90 and instructs the user terminal 20 to display the payment details notification screen provided with the region displaying the information on the coupon-provider member shop and the promotion of the promoted product as a message (S43).

[Effect]

The information output device 11 according to this embodiment acquires the route information that is the search result to the destination set via the user terminal 20. The information output device 11 refers to the shop information, which is stored in the storage unit in association with at least one of the location information and the privilege information, and specifies the first shop having the predetermined locational relationship with the route and the second shop having no predetermined locational relationship with the route. The information output device 11 transmits to the user terminal 20 the combined information in which the privilege information on the first shop and the information on the second shop are combined. In this way, the information output device 11 is able to provide the information on a shop not around the route of the user as information with content that the user easily receives.

Note that, in order to achieve the above-described effect using the information output device 11 according to this embodiment, the matching system 10 may not have to have all the constituents illustrated in FIG. 7. For example, the matching system 10 only has to have at least the information output device 11, the course information 60, and the member shop information 62.

Figure 25:
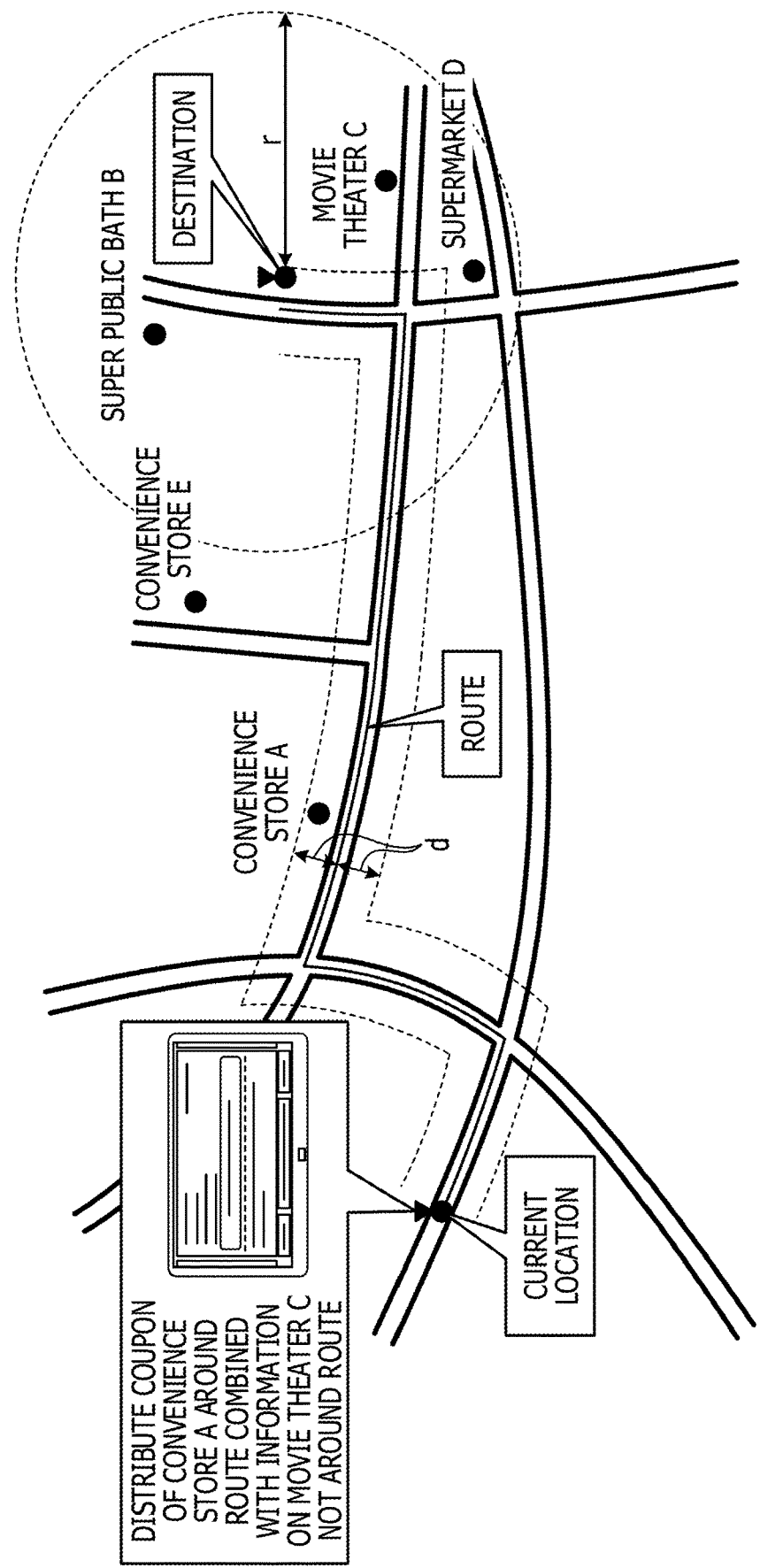
FIG. 25 is a diagram for describing matching according to Embodiment 2.

FIG. 25 is a diagram for describing matching according to Embodiment 2. In the example of FIG. 25, the acquisition section 90 determines within a distance d from one point on the route as around the route and determines within a radius r from the destination coordinates as around the destination. In this case, for example, the acquisition section 90 acquires the convenience store A as the member shop around the route and acquires the movie theater C as the member shop around the destination.

At this point, being within the distance d from one point on the route is an example in which there is the predetermined locational relationship with the route. The convenience store A is the exemplary first shop since it is within the distance d from one point on the route. The movie theater C is the exemplary second shop since it is not within the distance d from any point on the route.

At this point, the coupon distribution screen 210 of the user terminal 20 displays a combination of the coupon of the convenience store A around the route and the information on the movie theater C not around the route. Thus, the user easily receives the content of the information on the movie theater C not around the route that the user ordinarily hardly receives, since it is distributed with the coupon that the user easily uses.

Note that, as the member shop around the destination, the acquisition section 90 may acquire not only the movie theater C but also the super public bath B and the supermarket D. In the example of FIG. 25, a convenience store E is acquired as neither the member shop around the route nor the member shop around the destination.

When detecting the purchase activity using the combined information by the user associated with the user terminal 20 at the first shop, the distribution section 92 allows the terminal provided in the first shop to output the receipt including the information for introducing the second shop with the information indicating the payment details as a result of the purchase activity. In this way, it is possible to provide the user with the information on the second shop using both an electronic medium and a paper medium, and accordingly it is possible to more strongly encourage the user to use the second shop.

When detecting the purchase activity using the combined information by the user associated with the user terminal 20 at the first shop, the distribution section 92 transmits to the user terminal 20 the message including the information indicating the payment details at the first shop and the information for introducing the second shop. In this way, it is possible to provide the user with the information on the second shop even after using the coupon.

According to this embodiment, it is possible to notify the user of the information on multiple shops or facilities in a manner that the user easily receives the information through one data transmission, and thus it is possible to acquire an effect that the number of transmission processing is smaller than the case where the information on each shop or facility is individually transmitted.

Embodiment 3

Although the embodiments related to the disclosed device have been described, the disclosed technique may be implemented in various different forms other than the above-described embodiments. Thus, another embodiment included in the present disclosure is described below.

For example, although the example in which the coupon distribution processing is performed by the matching system 10 is described in the above embodiments, the disclosed system is not limited thereto. For example, the functional sections of the information output device 11 may be provided in the user terminal 20. In this case, it is assumed that the user terminal 20 may properly acquire information to be used in the coupon distribution processing out of the information stored in the storage device 12 and perform matching between the member shop around the route and the member shop not around the route.

For example, the user terminal 20 may be provided with an application for receiving the route search service from the navigation server 40, an application for receiving the weather information provision service from the weather information server 41, and an application for receiving the payment service from the payment application server 42.

Meanwhile, the user terminal 20 may be provided with a single application for receiving all of the route search service from the navigation server 40, the weather information provision service from the weather information server 41, and the payment service from the payment application server 42. In addition, the application for receiving each service may display the coupon distribution screen 210.

For example, the information output device 11 may estimate a transportation device of the user based on moving speed of the user terminal 20 acquired from the user terminal 20 and, based on the estimated transportation device, properly change a criterion for determining whether the member shop is around the route or whether the member shop is around the destination. For example, when the moving speed of the user terminal 20 is equal to or below 4 km/h, the information output device 11 determines that the user is moving on foot and determines within 500 m from the route as around the route while within 1 km from the destination as around the destination. On the other hand, when the moving speed of the user terminal 20 is more than 4 km/h, the information output device 11 determines that the user is moving by an automobile and determines within 1 km from the route as around the route while within 5 km from the destination as around the destination. In this way, it is possible to provide the user with information on a member shop that the user easily uses.

The member shop may be categorized in multiple groups. In this case, the information output device 11 provides the user with a coupon of the member shop around the route of the user combined with information on a member shop that is not around the route of the user but in the same group as the member shop around the route of the user.

FIG. 26 is a diagram that illustrates an exemplary data configuration of the member shop information including the group category. In the example of FIG. 26, the member shop is categorized into A bank group and B card group. The group categorization may be, for example, categorizing member shops receiving loans from the same bank into the same group, categorizing member shops in which the same credit card is available into the same group, categorizing member shops in which a common point card service is introduced into the same group, and the like.

In this case, the information output device 11 specifies the second shop from member shops belonging in the same group as the first shop. Thus, since the combined information on the member shops in the same group is distributed to the user, this does not only improve the convenience of the user but also increase the benefit of the entire group by concerting the member shops. A desirable structure for distributing the information on the shop to the user reflects not only the convenience of the user but also, naturally, a circumstance of the facility side. In addition, as for the circumstance of the facility side, a desirable structure reflects not only a circumstance of a single facility but also an entire circumstance of a group including multiple facilities. Specifying the second shop from the member shops belonging to the same group as the first shop makes it possible to execute shop information distribution processing to the user that reflects the entire circumstance of the group including multiple facilities.

The matching system 10 may be a single device or may include multiple devices. For example, the matching system 10 may be implemented as a single device that has functions of the information output device 11, the storage device 12, and the service provision device 13. The matching system 10 may have a single server device that has all functions of the API 50 to 54.

The constituents of the illustrated devices are like a functional concept and may not have to be physically constructed as the illustration. That is, a specific state of each device such as being separated or integrated is not limited to the illustration, and all or a part of the device may be constructed by being functionally or physically separated or integrated in an arbitrary unit. For example, the respective processing sections of the acquisition section 90, the specification section 91, and the distribution section 92 of the information output device 11 may be properly integrated or separated. All or any part of the processing functions executed by the processing sections may be implemented by a CPU and a program analyzed and executed by the CPU, or may be implemented as hardware in the wired logic.

[Information Output Program]

Figure 27:
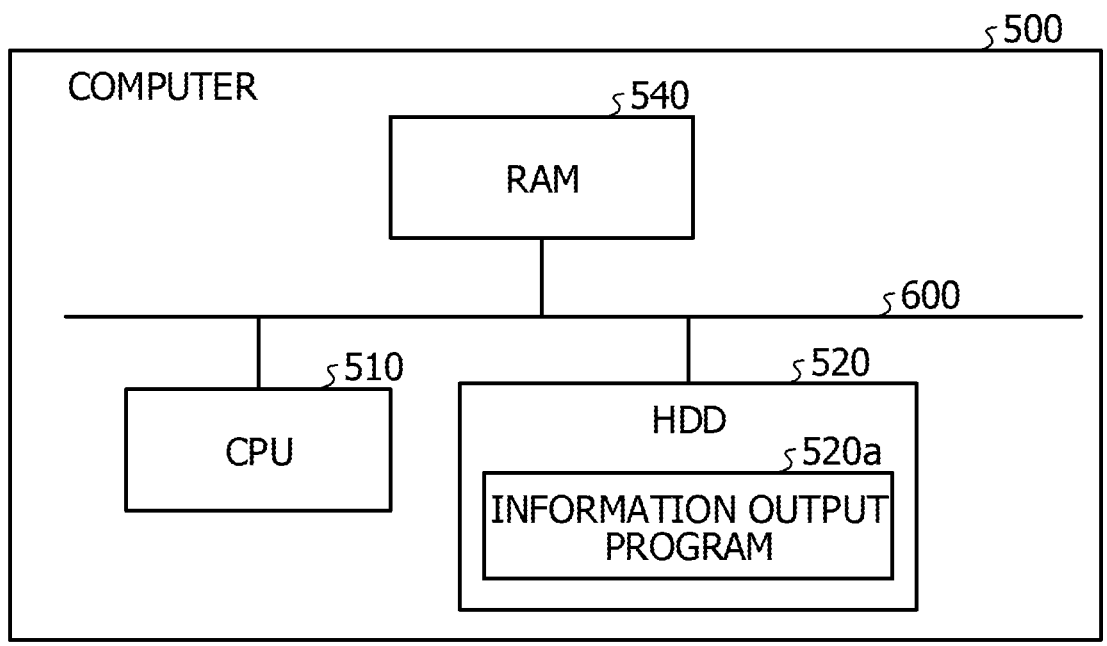
FIG. 27 is a diagram that illustrates a computer that executes an information output program.

The various kinds of processing described in the above embodiments may be implemented by executing a prepared program by a computer system such as a personal computer and a work station. Thus, hereinafter, an exemplary computer system that executes a program that has the similar function as the above embodiments is described. FIG. 27 is a diagram that illustrates a computer that executes an information output program.

As illustrated in FIG. 27, the computer 500 has a CPU 510, a hard disk drive (HDD) 520, and a random access memory (RAM) 540. These units 510 to 540 are connected with each other via a bus 600.

The HDD 520 stores in advance an information output program 520*a* that functions similarly with the processing sections of the above embodiments. For example, the HDD 520 stores the information output program 520*a* that functions similarly with the information output device 11 of the above embodiments. Note that the information output program 520*a* may be properly separated.

The HDD 520 stores various kinds of data. For example, the HDD 520 stores an OS and various kinds of data.

The CPU 510 executes the similar operation as the processing sections of the embodiments by reading the information output program 520*a* from the HDD 520 to execute it. That is, the information output program 520*a* executes the similar operation as the information output device 11 of the embodiments.

Note that the above-described information output program 520*a* may not have to be initially stored in the HDD 520. For example, the program may be stored in a "portable physical medium" inserted in the computer such as a flexible disk (FD), a compact disk read only memory (CD-ROM), a digital versatile disk (DVD), a magnetooptical disk, and an IC card. The computer 500 then may execute the program by reading it from these media.

Otherwise, the program may be stored in "another computer (or server)" connected to the computer 500 via a public line, the Internet, the LAN, a WAN, and the like. The computer 500 then may execute the program by reading it from the other computer or server.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium recording an information output program causing a computer to execute processing comprising:
   specifying a route in relation with a specific terminal based on a route search condition set at the specific terminal or a route search result with the route search condition;
   referring to location information on a plurality of shops or a plurality of facilities stored in a storage device;
   specifying a first shop or a first facility which is around the route in relation with the specific terminal;
   acquiring weather information of a location of the specific terminal;
   acquiring information of a product or a service which is recommended for a user of the specific terminal from products or services of the plurality of shops or the plurality of facilities based on the weather information; and
   allowing, in accordance with detection of a charge payment event corresponding to the specific terminal at the first shop or the first facility, a terminal corresponding to the first shop, a terminal corresponding to the first facility, the specific terminal, or a terminal associated with the specific terminal to output information on a second shop or a second facility which provides the product or the service.

2. The non-transitory computer-readable recording medium according to claim 1, wherein when the specific terminal or the terminal associated with the specific terminal outputs the information on the second shop or the second facility, the information on the second shop or the second facility is transmitted to the specific terminal or the terminal associated with the specific terminal via a network.

3. The non-transitory computer-readable recording medium according to claim 1, wherein in the specifying the first shop or the first facility, a shop or a facility around a point on the route where the specific terminal has not passed yet is specified as the first shop or the first facility.

4. The non-transitory computer-readable recording medium according to claim 1, further comprising:
   distributing privilege information on the first shop or the first facility to the specific terminal with the information on the second shop or the second facility,
   wherein in the outputting the information, in accordance with detection of a charge payment event using the privilege information, the terminal corresponding to the first shop, the terminal corresponding to the first facility, the specific terminal, or the terminal associated with the specific terminal is allowed to output the information on the second shop or the second facility.

5. The non-transitory computer-readable recording medium according to claim 4, wherein when the specific terminal or the terminal associated with the specific terminal outputs the information on the second shop or the second facility, the information on the second shop or the second facility is transmitted to the specific terminal or the terminal associated with the specific terminal via a network.

6. An information output method comprising:
   specifying, by a computer, a route in relation with a specific terminal based on a route search condition set at the specific terminal or a route search result with the route search condition;
   referring to location information on a plurality of shops or a plurality of facilities stored in a storage device;
   specifying a first shop or a first facility which is around the route in relation with the specific terminal;
   acquiring weather information of a location of the specific terminal;
   acquiring information of a product or a service which is recommended for a user of the specific terminal from products or services of the plurality of shops or the plurality of facilities based on the weather information; and
   allowing, in accordance with detection of a charge payment event corresponding to the specific terminal at the first shop or the first facility, a terminal corresponding to the first shop, a terminal corresponding to the first facility, the specific terminal, or a terminal associated with the specific terminal to output information on a second shop or a second facility which provides the product or the service.

7. The information output method according to claim 6, wherein when the specific terminal or the terminal associated with the specific terminal outputs the information on the second shop or the second facility, the information on the second shop or the second facility is transmitted to the specific terminal or the terminal associated with the specific terminal via a network.

8. The information output method according to claim 6, wherein in the specifying the first shop or the first facility, a shop or a facility around a point on the route where the specific terminal has not passed yet is specified as the first shop or the first facility.

9. The information output method according to claim 6, further comprising:
   distributing privilege information on the first shop or the first facility to the specific terminal with the information on the second shop or the second facility,
   wherein in the outputting the information, in accordance with detection of a charge payment event using the privilege information, the terminal corresponding to the first shop, the terminal corresponding to the first facility, the specific terminal, or the terminal associated with the specific terminal is allowed to output the information on the second shop or the second facility.

10. The information output method according to claim 9, wherein when the specific terminal or the terminal associated with the specific terminal outputs the information on the second shop or the second facility, the information on the second shop or the second facility is transmitted to the specific terminal or the terminal associated with the specific terminal via a network.

11. An information processing apparatus comprising:
   a communication interface; and
   a processor coupled to the communication interface and configured to:
      specify a route in relation with a specific terminal based on a route search condition set at the specific terminal or a route search result with the route search condition;
      refer to location information on a plurality of shops or a plurality of facilities stored in a storage device;
      specify a first shop or a first facility which is around the route in relation with the specific terminal;
      acquire weather information of a location of the specific terminal;
      acquire information of a product or a service which is recommended for a user of the specific terminal from products or services of the plurality of shops or the plurality of facilities based on the weather information; and
      allow, in accordance with detection of a charge payment event corresponding to the specific terminal at the first shop or the first facility, a terminal corresponding to the first shop, a terminal corresponding to the first facility, the specific terminal, or a terminal associated with the specific terminal to output information on a second shop or a second facility which provides the product or the service.

12. The information processing apparatus according to claim 11, wherein the processor, when the specific terminal or the terminal associated with the specific terminal outputs the information on the second shop or the second facility, transmits the information on the second shop or the second facility to the specific terminal or the terminal associated with the specific terminal via a network.

13. The information processing apparatus according to claim 11, wherein the processor specifies a shop or a facility around a point on the route where the specific terminal has not passed yet is specified as the first shop or the first facility.

14. The information processing apparatus according to claim 11, wherein the processor:
   distributes privilege information on the first shop or the first facility to the specific terminal with the information on the second shop or the second facility, and
   allows, in accordance with detection of a charge payment event using the privilege information, the terminal corresponding to the first shop, the terminal corresponding to the first facility, the specific terminal, or the terminal associated with the specific terminal to output the information on the second shop or the second facility.

15. The information processing apparatus according to claim 14, wherein the processor, when the specific terminal or the terminal associated with the specific terminal outputs the information on the second shop or the second facility, transmits the information on the second shop or the second facility to the specific terminal or the terminal associated with the specific terminal via a network.

* * * * *